(12) United States Patent
Saban et al.

(10) Patent No.: US 11,196,310 B2
(45) Date of Patent: Dec. 7, 2021

(54) PERMANENT MAGNET ASSEMBLIES FOR A CYLINDER OF AN ELECTRICAL MACHINE

(71) Applicant: Zunum Aero, Inc., Bothell, WA (US)

(72) Inventors: Daniel M. Saban, South Elgin, IL (US); Matthew Feddersen, Elgin, IL (US)

(73) Assignee: Zunum Aero, Inc., Bothell, WA (US)

( * ) Notice: Subject to any disclaimer, the term of this patent is extended or adjusted under 35 U.S.C. 154(b) by 596 days.

(21) Appl. No.: 16/049,662

(22) Filed: Jul. 30, 2018

(65) Prior Publication Data

US 2020/0036246 A1    Jan. 30, 2020

(51) Int. Cl.
*H02K 1/30* (2006.01)
*H02K 21/14* (2006.01)
*H02K 1/27* (2006.01)

(52) U.S. Cl.
CPC .............. *H02K 1/30* (2013.01); *H02K 1/278* (2013.01); *H02K 21/14* (2013.01)

(58) Field of Classification Search
CPC .......... H02K 1/30; H02K 21/14; H02K 1/278; H02K 1/02
See application file for complete search history.

(56) References Cited

U.S. PATENT DOCUMENTS

| | | |
|---|---|---|
| 5,640,064 A | 6/1997 | Boyd et al. |
| 5,668,429 A | 9/1997 | Boyd et al. |
| 5,852,338 A | 12/1998 | Boyd et al. |
| 5,894,182 A | 4/1999 | Saban et al. |
| 5,911,453 A | 6/1999 | Boyd et al. |
| 5,990,588 A | 11/1999 | Kliman et al. |
| 6,002,191 A | 12/1999 | Saban |
| 6,018,207 A | 1/2000 | Saban et al. |
| 6,063,827 A | 5/2000 | Sacripante et al. |
| 6,088,905 A | 7/2000 | Boyd et al. |
| 6,127,080 A | 10/2000 | Sacripante et al. |
| 6,223,417 B1 | 5/2001 | Saban et al. |
| 6,324,494 B1 | 11/2001 | Saban |
| 6,388,356 B1 | 5/2002 | Saban |
| 6,492,756 B1 * | 12/2002 | Maslov ................. B62M 6/45 310/156.12 |
| 6,504,337 B1 | 1/2003 | Saban et al. |
| 6,777,847 B1 | 8/2004 | Saban et al. |

(Continued)

OTHER PUBLICATIONS

U.S. Appl. No. 16/049,684; Application, Declaration and POA filed Jul. 30, 2018; 112 pages.

(Continued)

*Primary Examiner* — Tulsidas C Patel
*Assistant Examiner* — Riley Owen Stout
(74) *Attorney, Agent, or Firm* — Berkeley Law & Technology Group, LLP

(57) ABSTRACT

Disclosed is a rotor for an electrical machine includes a rotor hub comprising a multifaceted surface extending along a perimeter of the rotor hub. Each facet of the multi-faceted surface may have a substantially planar surface. A plurality of permanent magnet assemblies is disposed circumferentially around the multifaceted surface. Each individual permanent magnet assembly of the plurality of permanent magnet assemblies is coupled to the substantially planar surface of a corresponding facet.

20 Claims, 19 Drawing Sheets

(56) References Cited

U.S. PATENT DOCUMENTS

| | | |
|---|---|---|
| 6,934,666 B2 | 8/2005 | Saban et al. |
| 6,967,461 B1 | 11/2005 | Markunas et al. |
| 7,075,399 B2 | 7/2006 | Saban et al. |
| 7,208,854 B1 | 4/2007 | Saban et al. |
| 7,348,707 B2 | 3/2008 | Laskaris et al. |
| 7,573,144 B1 | 8/2009 | Saban et al. |
| 7,710,081 B2 | 5/2010 | Saban et al. |
| 7,791,238 B2 | 9/2010 | Pal et al. |
| 7,859,212 B2 | 12/2010 | Pan et al. |
| 7,960,948 B2 | 6/2011 | Saban et al. |
| 8,040,007 B2 | 10/2011 | Petrov et al. |
| 8,154,158 B2 | 4/2012 | Saban et al. |
| 8,179,009 B2 | 5/2012 | Saban |
| 8,183,734 B2 | 5/2012 | Saban et al. |
| 8,237,320 B2 | 8/2012 | Saban et al. |
| 8,247,938 B2 | 8/2012 | Saban et al. |
| 8,253,298 B2 | 8/2012 | Saban et al. |
| 8,310,123 B2 | 11/2012 | Saban et al. |
| 8,350,432 B2 | 1/2013 | Guedes-Pinto et al. |
| 8,415,854 B2 | 4/2013 | Saban et al. |
| 8,421,297 B2 | 4/2013 | Stout et al. |
| 8,456,047 B2 | 6/2013 | Pal et al. |
| 8,901,791 B2 | 12/2014 | Saban et al. |
| 9,670,277 B2 | 6/2017 | Dana et al. |
| 9,918,808 B2 | 3/2018 | Garcia Saban et al. |
| 9,991,772 B2 | 6/2018 | Totaro et al. |
| 10,122,227 B1 * | 11/2018 | Long ..................... H02K 15/03 |
| 2003/0074165 A1 | 4/2003 | Saban et al. |
| 2004/0189429 A1 | 9/2004 | Saban et al. |
| 2007/0018516 A1 | 1/2007 | Pal et al. |
| 2008/0103632 A1 | 5/2008 | Saban et al. |
| 2008/0224551 A1 | 9/2008 | Saban et al. |
| 2008/0238234 A1 | 10/2008 | Saban et al. |
| 2009/0061337 A1 | 3/2009 | Wu et al. |
| 2009/0200809 A1 | 8/2009 | Saban et al. |
| 2009/0218977 A1 | 9/2009 | Pan et al. |
| 2010/0019589 A1 | 1/2010 | Saban et al. |
| 2010/0019590 A1 | 1/2010 | Guedes-Pinto et al. |
| 2010/0019598 A1 | 1/2010 | Saban |
| 2010/0019599 A1 | 1/2010 | Saban |
| 2010/0019600 A1 | 1/2010 | Saban et al. |
| 2010/0019601 A1 | 1/2010 | Saban et al. |
| 2010/0019602 A1 | 1/2010 | Saban et al. |
| 2010/0019603 A1 | 1/2010 | Saban et al. |
| 2010/0019609 A1 | 1/2010 | Stout et al. |
| 2010/0019610 A1 | 1/2010 | Saban et al. |
| 2010/0019613 A1 | 1/2010 | Saban et al. |
| 2010/0019626 A1 | 1/2010 | Stout et al. |
| 2010/0171383 A1 | 7/2010 | Petrov et al. |
| 2010/0244599 A1 | 9/2010 | Saban et al. |
| 2010/0277026 A1 * | 11/2010 | Yamaguchi ............ H02K 21/16 310/156.25 |
| 2010/0289353 A1 | 11/2010 | Pal et al. |
| 2012/0169171 A1 | 7/2012 | Jansen et al. |
| 2013/0169097 A1 | 7/2013 | Saban et al. |
| 2013/0169099 A1 | 7/2013 | Saban et al. |
| 2013/0239578 A1 | 9/2013 | Saban et al. |
| 2014/0084731 A1 * | 3/2014 | Iwami ................... H02K 15/03 310/156.07 |
| 2015/0222151 A1 | 8/2015 | Semken et al. |
| 2016/0280386 A1 | 9/2016 | Mestler et al. |
| 2017/0040853 A1 | 2/2017 | Totaro et al. |
| 2017/0314353 A1 | 11/2017 | Viassolo et al. |
| 2018/0034332 A1 | 2/2018 | Takahashi |
| 2018/0145547 A1 | 5/2018 | Saban et al. |
| 2018/0145551 A1 | 5/2018 | Stephens et al. |
| 2018/0145572 A1 | 5/2018 | Saban et al. |
| 2018/0145573 A1 | 5/2018 | Saban et al. |
| 2020/0036247 A1 | 1/2020 | Saban |

OTHER PUBLICATIONS

U.S. Appl. No. 16/049,684; Notice to File Corrected Application Papers dated Sep. 13, 2018; 2 pages.
U.S. Appl. No. 16/049,684; Filing Receipt Sep. 13, 2018; 3 pages.
U.S. Appl. No. 16/049,684; Applicant Response to Pre-Exam Formalities Notice filed Mar. 8, 2019; 26 pages.
U.S. Appl. No. 16/049,684; Updated Filing Receipt Mar. 12, 2019; 3 pages.
U.S. Appl. No. 16/049,684; Notice of Publication Jan. 30, 2020; 1 page.
Bjork, et al, "Analysis of the magnetic field, force, and torque for two-dimensional Halbach cylinders," Journal of Magnetism and Magnetic Materials, Link to article, DOI: 10.1016/j.jmmm.2009.08.044, 2010, 12 Pages.
Chen, "Mechanical Design of High Frequency, High Power Density Electric Machine," Thesis submitted in partial fulfillment of the requirements for the degree of Master of Science in Electrical and Computer Engineering in the Graduate College of the University of Illinois at Urbana-Champaign, 2016, 72 Pages.
Cho, et al., "Detailed Electromagnetic Analysis of a High Specific Power Slotless Permanent Magnet Motor with Imbalanced Armature Windings," https://www.semanticscholar.org/paper/Detailed-Electromagnetic-Analysis-of-a-High-Power-Cho-Yoon/d3e73a4d147c6f8bdbf5b79d2299e944d1d5bb92, 2017, 2 Pages.
Halbach, "Design of Permanent Multipole Magnets with Oriented Rare Earth Cobalt Materials," Nuclear Instruments and Methods 169 (1980) pp. 1-10, DOI: 1016/0029-554X(80)90094-4, 12 Pages.
Office Action, U.S. Appl. No. 16/049,684, dated Mar. 19, 2021, 44 Pages.
Notice of Abandonment, U.S. Appl. No. 16/049,684, dated Sep. 27, 2021, 2 Pages.

* cited by examiner

PERMANENT MAGNET ASSEMBLIES FOR A CYLINDER OF AN ELECTRICAL MACHINE

CROSS-REFERENCE TO RELATED APPLICATIONS

This application is being filed concurrently with U.S. patent application Ser. No. 16/049,684 titled PERMANENT MAGNET ASSEMBLIES FOR A CYLINDER OF AN ELECTRICAL MACHINE, assigned to the assignee hereof and incorporated herein by reference in its entirety.

BACKGROUND

1. Field

Subject matter disclosed herein relates to permanent magnet assemblies for use in an electrical machine.

2. Information

An electrical machine may include a rotary system comprising at least a rotor and a stator. A rotor may include a rotor hub onto which a plurality of permanent magnets and/or permanent magnet pole segments are affixed or otherwise attached. The permanent magnets and/or permanent magnet pole segments may produce a magnetic field which may be used to create a torque in either rotational direction or to accelerate or decelerate the rotational motion of the rotor, for example.

BRIEF DESCRIPTION OF DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
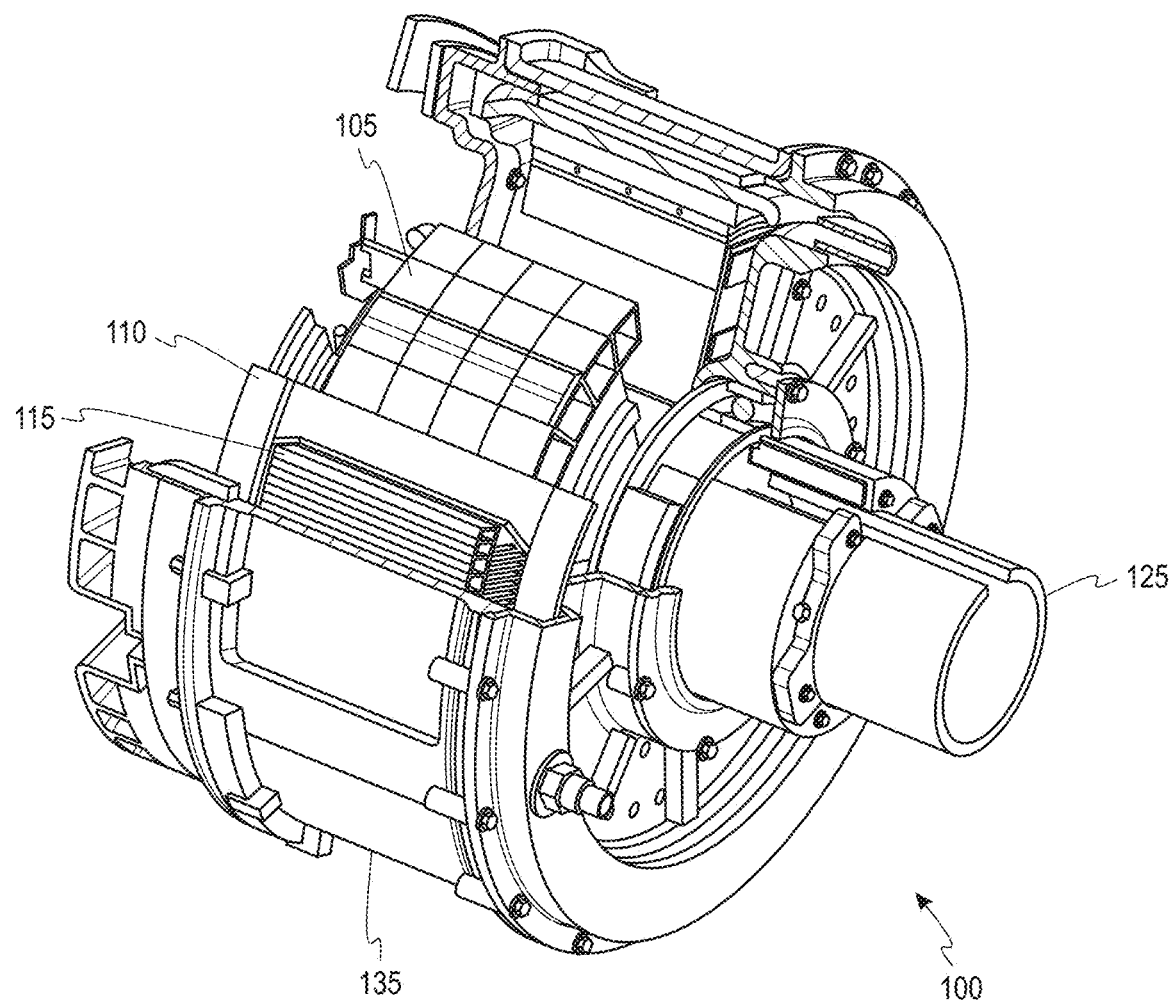
FIG. 1 illustrates an electrical machine according to an embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the patent application, particular context of description and/or usage provides helpful guidance regarding reasonable inferences to be drawn; however, likewise, "in this context" in general without further qualification refers to the context of the present patent application.

An airplane may comprise a fixed-wing aircraft which is propelled forward by thrust from one or more engines. For example, an airplane may include multiple engines. Alternatively, torque from engines may drive a propeller to create thrust or torque from a motor may drive a propeller or fan to create thrust. An airplane may include one or more electrical machines, such as a motor, for example, as a prime mover for a propeller or fan to assist in generation of thrust for a take-off, cruise, flight maneuvers, or landing procedure of the airplane.

An electrical machine may include a rotary system comprising an outside stator and an inside rotor. An outside stator may include coils supplied with an alternating current to produce a rotating magnetic field. An inside rotor may be attached to an output shaft producing a second rotating magnetic field. A rotor hub, for example, provides a structural framework onto which magnets may be affixed. A rotor magnetic field may be produced, at least in part, by permanent magnets, for example.

Permanent magnets may be mounted onto a rotor hub of an electrical machine. Permanent magnets may be formed of rare-earth metals, for example. In an embodiment, a permanent magnet may comprise a relatively powerful alloy having a crystalline structure with a relatively high magnetic anisotropy, resulting in the crystalline structures readily aligning in one direction while resisting the crystalline structures in other directions, for example. In an embodiment, one or more permanent magnets may be formed of a samarium-cobalt based or a neodymium-iron-boron based material. For example, such materials may be doped with other rare earth materials such as dysprosium to provide for a higher temperature tolerance.

An electric motor comprises an electrical machine which converts electrical energy into mechanical energy. An electric generator comprises an electrical machine which may convert mechanical energy into electrical energy. An electric motor may operate through an interaction between a rotor's magnetic field and a stator's magnetic field to generate a torque. A phase relationship of voltage and current at terminals of an electrical machine may be shifted by an outside influence, such as a power converter or by a grid disturbance, for example, to send power out rather than into the electric machine in one particular implementation. For example, an electric machine that may operate as a motor or as a generator.

In an electric motor, a rotor may comprise a moving part which turns a shaft to deliver mechanical torque. A stator may comprise a stationary part of a motor's electromagnetic circuit. The stator may comprise windings in a particular implementation.

An electromagnetic coil may comprise an electrical conductor such as a wire in the shape of a coil, spiral, or helix, for example. Electromagnetic coils may be used in an application where electric currents induce magnetic fields, in devices such as electric motors, generators, inductors, electromagnets, transformers, and sensor coils.

A current through a conductor induces a circular magnetic field around the conductor. The wire or conductor which constitutes the coil may be referred to as a "winding."

A rotor may comprise a moving component of an electromagnetic system in the electric motor, electric generator, or alternator. Its rotation may be due, at least in part, to a magnetic field from the windings, which produces a torque about the rotor's axis.

According to an embodiment, a rotor including one or more permanent magnets and/or permanent magnet pole segments disposed within an interior of the rotor may provide improved traction and/or use with relatively low speed applications requiring significant torque from standstill. A rotor including surface-mounted permanent magnets, on the other hand, may provide advantages for relatively high-speed applications which may require little torque at low speed. Surface-mount permanent magnet machines may be built with a variety of magnet configurations. In one embodiment, a rotor may include a rotor hub having a plurality of facets. A "rotor hub," as used herein, refers to a structural framework for a rotor. For example, a rotor hub may provide a structural framework onto which magnets may be affixed and/or arranged. A rotor hub may carry or otherwise provide a structure through which a rotor flux may flow. In a particular embodiment, a rotor hub may be coupled to a shaft and one or more magnets may be affixed to the rotor hub. In another embodiment, for example, a rotor hub may be coupled to a shaft, approximately radial support members may be coupled to a perimeter of the rotor hub, and the magnets may be affixed to the approximately radial support members.

A "facet," as used herein, refers to one side or surface of an object having multiple sides or surfaces. For example, a plurality of facets may be disposed along a surface of a rotor hub. In an embodiment, a facet may include an approximately flat or planar surface.

One or more flat-bottom permanent magnets and/or permanent magnet pole segments may be affixed or adhered to one or more facets of a rotor hub. A "permanent magnet," as used herein, refers to a piece of magnetic material which maintains its magnetic properties in the absence of an inducing field or current.

A permanent magnet may be segmented, or divided, into two or more segments. A "permanent magnet pole segment" or "permanent magnet segment," as used herein, refers to a piece of magnetic material which maintains its magnetic properties in the absence of an inducing field or current and which may be combined with another permanent magnet pole segment to realize a single magnetic pole of a rotor of an electric machine, or of the electric machine itself. A single permanent magnet pole segment by itself, for example, may not comprise a magnetic pole for a rotor. However, two or more permanent magnet pole segments may be arranged so that they collectively comprise a single magnetic pole of a rotor, for example. For example, two or more permanent magnet pole segments may be arranged in a particular manner on a facet of a rotor hub to realize a particular magnetic flux density. A permanent magnet and/or a permanent magnet pole segment may be shaped according to particular dimensions. For example, a permanent magnet and/or a permanent magnet pole segment may comprise piece of magnetic material formed in a rectangular prism in one particular embodiment.

A permanent magnet and a permanent magnet pole segment each have two poles. In an electric machine, permanent magnets PMs may be arranged to create either wholly or in part a magnetic pole arrangement for the rotor. If one physical piece presents a pole to a permanent magnet machine airgap (e.g., the north pole of the magnet, provides a north pole for the rotor, whereas the south pole of the same physical piece rests against the rotor hub) that physical piece may be referred to a "permanent magnet." If two or more physical pieces combine to present a magnetic pole to the airgap, then those physical pieces may be referred to as "permanent magnet pole segments." Permanent magnets may be segmented circumferentially (e.g., along radial planes) or axially (e.g., along normal planes).

In one embodiment, one or more flat-bottomed permanent magnets and/or permanent magnet pole segments (e.g., having a flat or planar surface) may be affixed to individual facets of a rotor hub to cover an outside surface of the rotor hub. Use of a multi-faceted rotor hub with flat-bottomed permanent magnets and/or permanent magnet pole segments may have advantages relative to a rounded rotor hub which is not multi-faceted. For example, flat-bottomed permanent magnets and/or permanent magnet pole segments for use with a multi-faceted rotor hub may be more cost-effective to manufacture, relatively more reliable, and less expensive to manufacture than would round-bottomed permanent magnets and/or permanent magnet pole segments for use with a rounded rotor hub which lacks facets.

Figure 9A:
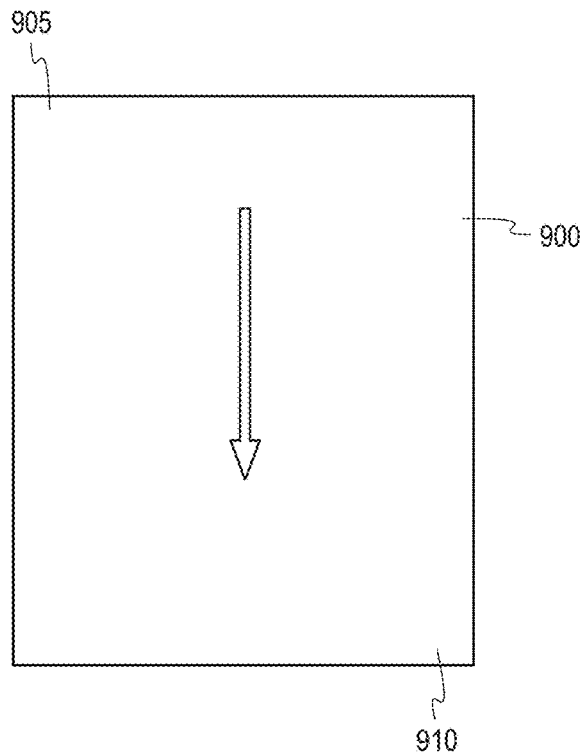
FIG. 9A illustrates a block of permanent magnet material according to an embodiment.

In one particular implementation, a relatively large block of magnetic material may be machined or cut down into smaller pieces which may be affixed to a rotor hub. FIG. 9A illustrates a block 900 of magnetic material according to an embodiment. Although block 900 as illustrated in FIG. 9A has an approximately rectangular prism shape, it should be appreciated that block 900 may have different shapes, depending on a particular application. Block 900 may comprise a permanent magnet, for example. In one particular implementation, for example, a block 900 may comprise a relatively large sheet of magnetic material. For example, a manufacturer or vendor of a permanent magnets may sell a bulk piece of magnetic material, such as a relatively large block 900 or sheet of a magnetic material, such as a permanent magnet, and a purchaser may utilize various machinery to extract various permanent magnets and/or permanent magnet pole segments from the block 900 or sheet of the magnetic material.

As illustrated, block 900 comprises a permanent magnet which includes a north-seeking pole 905 and a south-seeking pole 910. Additionally, block 900 may have a rectangular face and thickness to form a rectangular prism. Also, block 900 may be magnetically polarized such that a direction of polarization is substantially parallel to two sides of the rectangular face and substantially orthogonal to two other sides of the rectangular face. In one particular implementation, block 900 may be machined so that smaller permanent magnets and/or permanent magnet pole segments may be extracted in order to be affixed to a rotor hub. If a rotor hub has a plurality of flat facets, block 900 may be machined to extract smaller permanent magnets and/or permanent magnet pole segments having approximately flat or planar faces which may be affixed to the facets. On the other hand, if a rotor hub has an outer dimension of a rounded object, such as a cylinder, block 900 may be machined into smaller permanent magnets and/or permanent magnet pole segments having rounded faces to be affixed around an outer perimeter of the rotor hub.

Figure 9B:
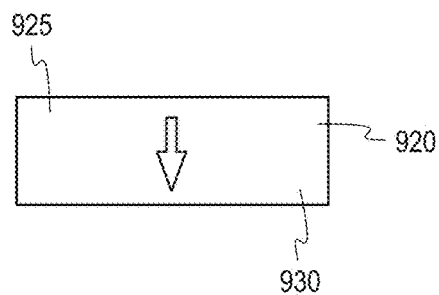
FIG. 9B illustrates a first magnet segment according to an embodiment.

FIG. 9B illustrates a first permanent magnet 920 according to an embodiment. As shown, first permanent magnet 920 has a shape approximating a rectangular prism in this implementation. First permanent magnet 920 includes top and bottom surfaces which are relatively flat and planar. One or both of north-seeking pole 925 and/or a south-seeking pole 930 may be located on or near a surface of first permanent magnet 920 which is relatively flat and planar. For example, by using a relatively flat and relatively planar surface, first permanent magnet 920 may be affixed to a facet of multi-faceted rotor with relative ease and with reduced cost. In one particular implementation, a first permanent magnet 920 may be extracted from block 900 which has dimensions on a planar and flat surface which are approximately the same as dimensions of a facet of the rotor hub. Accordingly, first permanent magnet 920 may be affixed or adhered to approximately an entirety of an outer edge or face of a facet, for example.

Figure 9C:
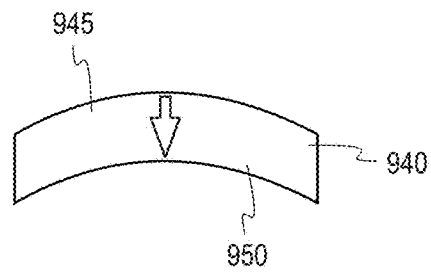
FIG. 9C illustrates a second magnet segment according to an embodiment.

FIG. 9C illustrates a second permanent magnet 940 according to an embodiment. As shown, second permanent magnet 940 has an approximately arched or rounded surface in this implementation. For example, second permanent magnet 940 includes top and bottom surfaces which are relatively curved or arched. One or both of north-seeking pole 925 and/or a south-seeking pole 930 may be located on or near a surface of second permanent magnet 940 which is relatively curved or arched. If rotor hub has a round cylindrical or arched surface or shape, such as a rotor hub which is not multi-faceted, for example, second permanent magnet 940 may include an arched surface which may be affixed to a corresponded arched or curved surface of a rotor hub.

In the embodiments shown in FIGS. 9B and 9C, first permanent magnet 920 and second permanent magnet 940 each comprise a single magnetic pole of a rotor. However, it should be appreciated that in a particular embodiment, a permanent magnet pole segment may be machined from block 900 where the permanent magnet pole segment in combination with one or more additional permanent magnet pole segments may comprise a single magnetic pole of a rotor, for example.

First permanent magnet 920 and second permanent magnet 940 may be machined or otherwise cut or extracted from block 900 of magnetic material as shown in FIGS. 9A-9C. A machining operation may be performed more easily, more precisely, and with reduced cost if, for example, a machining operation is performed to extract a permanent magnet which approximates a rectangular prism, such as first permanent magnet 920 shown in FIG. 9B. For example, performing a machining operation to extract a permanent magnet which has approximately flat planar surfaces may be simpler to perform than would a machining operation to extract a permanent magnet which has one or more approximately curved or arched surfaces, such as second permanent magnet 940 shown in FIG. 9C.

For example, in order to perform a machining operation to extract a permanent magnet having an approximately arched or curved surface, such as second permanent magnet 940 shown in FIG. 9C, a precise measure of an angle of curvature of a rotor hub may be initially performed. However, if an angle of curvature of a machined permanent magnet is slightly different from an angle of curvature of a rotor hub onto which the permanent magnet is to be affixed, a bond between the permanent magnet and a surface of the rotor hub may be relatively weak. Moreover, a machining operation to extract a permanent magnet having one or more approximately arched or curved surfaces may be more likely to damage the permanent magnet during extraction.

First permanent magnet 920 and second permanent magnet 940 may be machined or otherwise cut or extracted from block 900 of magnetic material to achieve a desired polarization, for example. First permanent magnet 920 shown in FIG. 9B may polarized in a north-seeking direction, for example, where a direction of polarization is substantially normal or perpendicular to a top planar surface of the first permanent magnet 920. If a different direction of polarization is desired, such as polarization in a direction which is substantially parallel to a top planar surface of the first permanent magnet 920, however, first permanent magnet 920 may be extracted from block 900 in such a way so that the desired polarization of first permanent magnet 920 is obtained.

If a permanent magnet and/or a permanent magnet pole segment is damaged at some point during its lifetime, additional costs may be incurred to replace a permanent magnet and/or a permanent magnet pole segment having an approximately curved or arched surface than may be incurred to replace a permanent magnet and/or a permanent magnet pole segment having one or more approximately flat and planar surfaces.

Figure 10A:
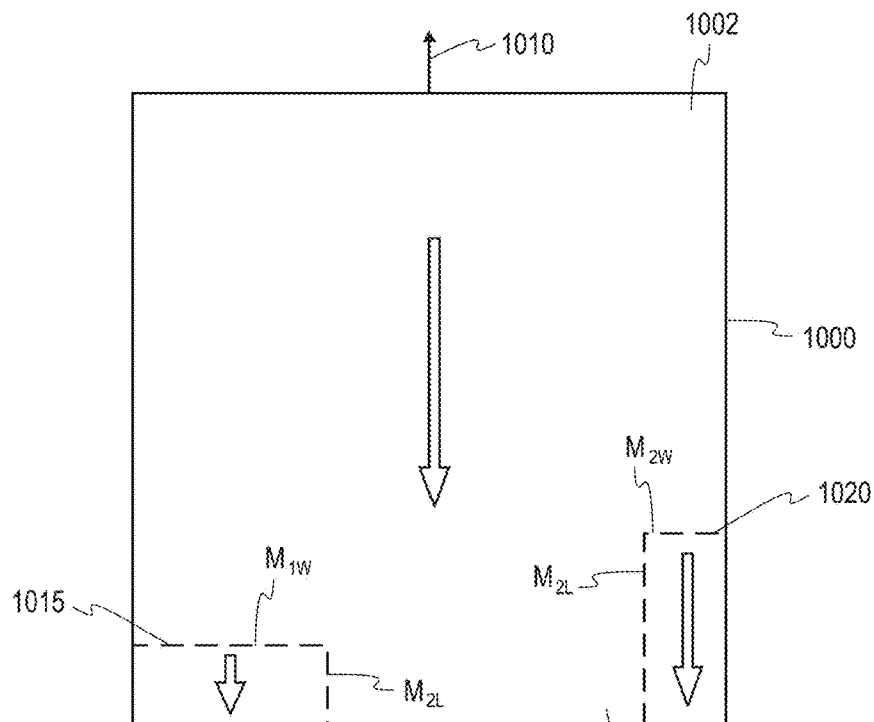
FIG. 10A illustrates a block of permanent magnet material according to an embodiment.

Results of a process for extracting a permanent magnet and/or a permanent magnet pole segment of a desired polarization from a block of magnetic material are discussed below with respect to FIGS. 10A-C. FIG. 10A illustrates a block 1000 of permanent magnet material according to an embodiment. Although block 1000 as illustrated in FIG. 10A has an approximately rectangular prism shape, it should be appreciated that block 1000 may have different shapes, depending on a particular application, such as a relatively large sheet of magnetic material, as discussed above.

As illustrated, block 1000 comprises a permanent magnet which includes a north-seeking pole 1002 and a south-seeking pole 1004. Block 1000 may include a top planer surface 1005 and a bottom planar surface 1006. "Top" and "bottom" are utilized to refer to surfaces on block 1000 solely for the sake of illustration. Block 1000 may be polarized in a direction as shown by arrow 1010. In this example, block 1000 is polarized in a direction which is substantially normal or perpendicular to top planar surface 1005 of block 1000, as indicated by arrow 1010. Block 1000 may be machined in order to extract one or more permanent magnets and/or permanent magnet pole segments, such as first permanent magnet 1015 and second permanent magnet 1020. In this example, first permanent magnet 1015 and second permanent magnet 1020 may have similar dimensions, although they are polarized in different directions, as discussed below. However, it should be appreciated that permanent magnets and/or permanent magnet pole segments may be extracted having different dimensions, depending on a particular application.

Figure 10B:
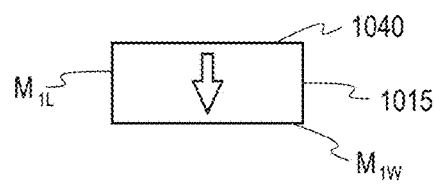
FIG. 10B illustrates a first permanent magnet according to an embodiment.

FIG. 10B illustrates a first permanent magnet 1015 according to an embodiment. FIG. 10C illustrates a second permanent magnet 1020 according to an embodiment. As shown, first permanent magnet 1015 may be extracted from block 1000 so that it has a relatively small height relative to its width. As illustrated, first permanent magnet 1015 has a width denoted as $M_{1W}$ and a length denoted as $M_{1L}$. Second permanent magnet 1020, on the other hand, may be extracted from block 1000 so that it has a relatively small width relative to its height. As illustrated, second permanent magnet 1020 has a width denoted as $M_{2W}$ and a length denoted as $M_{2L}$. In an orientation shown in FIG. 10A, first permanent magnet 1015 and second permanent magnet 1020 are both polarized in the same direction as the block 1000 from which they are extracted. However, if the orientation of first permanent magnet 1015 is maintained after extraction, but the origination of second permanent magnet 1020 is shifted 90 after extraction, first and second permanent magnet may therefore have approximately the same dimensions but with different polarizations. For example, first permanent magnet 1015 shown in FIG. 10B may be polarized in a direction which is substantially normal or perpendicular to a top planar surface 1040 of first permanent magnet 1015. For example, first permanent magnet 1015 may be extracted from block 1000 and is shown as being in the same orientation in FIG. 10B as first permanent magnet 1015 was prior to extraction from block 1000 as shown in FIG. 10A. For example, the top surface of first permanent magnet 1015 has a width denoted by $M_{2W}$ and a length denoted by $M_{2L}$ after extraction from block 1000 shown in FIG. 10A. In this example, first permanent magnet 1015 may therefore be polarized in substantially the same direction as is block 1000.

Figure 10C:
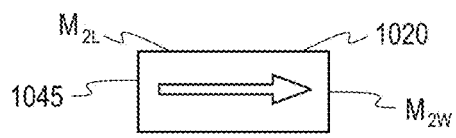
FIG. 10C illustrates a second permanent magnet according to an embodiment.

In an orientation shown in FIG. 10C, on the other hand, second permanent magnet 1020 may be polarized in a direction which is substantially parallel to a top planar surface of second permanent magnet 1020. For example, second permanent magnet 1020 may be extracted from block 1000 and is shown as being rotated 90° in FIG. 10C relative to its initial orientation prior to extraction from block 1000 as shown in FIG. 10A. For example, the top surface of second permanent magnet 1020 has a width denoted by $M_{2L}$ and a length denoted by $M_{2W}$ as a result of its 90° rotation after extraction from block 1000 shown in FIG. 10A. In this example, second permanent magnet 1020 may therefore be polarized in a direction which is substantially orthogonal or perpendicular to a direction of polarization of first permanent magnet 1015.

Figure 10D:
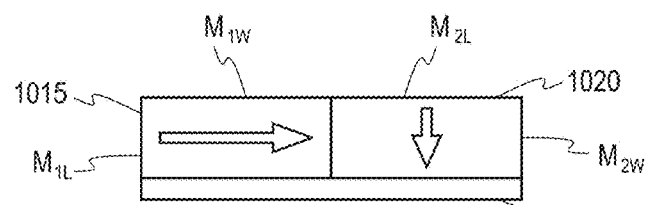
FIG. 10D illustrates a facet of a rotor hub onto which first and second permanent magnets may be affixed according to an embodiment.

In one particular embodiment, for example, two or more permanent magnets may be affixed to the same facet of a rotor hub. Relative sizes and polarizations of the two or more magnet segments may be selected in order to achieve a particular magnetic flux vector so as, for example, to more efficiently generate torque. FIG. 10D illustrates a facet 1050 of a rotor hub onto which first permanent magnet 1015 and second permanent magnet 1020 may be affixed according to an embodiment. Although first permanent magnet 1015 and second permanent magnet 1020 are illustrated as having similar rectangular prism dimensions in their respective orientations shown in FIG. 10D, it should be appreciated that the permanent magnet may have different dimensions, based, at least in part, on a desired magnetic flux direction and/or signature, such as discussed above. In an implementation, a facet of a rotor may comprise a substantially planar surface that is oriented substantially perpendicular to a radial line extending from an approximate center of the rotor hub. Such a surface may have a linear dimension $F_L$ that is perpendicular to the radial line. It may be observed that dimensions $M_{1L}$ and $M_{2L}$ may be substantially equal. In an embodiment, permanent magnets 1015 and 1020 may be sized such that $M_{1W}+M_{2L}=F_L$. According to an embodiment, while maintaining a constraint of $M_{1W}+M_{2L}=F_L$, $M_{1W}$ and $M_{2L}$ may be varied to tailor a composite vector of magnetic flux from a facet.

Although first permanent magnet 1015 and second permanent magnet 1020 are shown as comprising approximately rectangular prism shapes which are extracted at angles differing by 90°, it should be appreciated that permanent magnet may having different directions of polarization may be extracted from block 1000 in some embodiments. However, some portion of block 1000 may be rendered unusable and may therefore be wasted if, for example, machining operations are to be performed to extract permanent magnet having different oblique directions of polarization or having a shape other than a substantially rectangular prism shape, for example.

FIG. 1 illustrates an electrical machine 100 according to an embodiment. Electrical machine 100 may comprise a motor and/or generator, for example. Electrical machine 100 may be utilized to propel a fixed-wing aircraft in an implementation. Electrical machine 100 may include a rotor 105 and a stator 110. Stator 110 may include windings 115, for example. An exterior of rotor 105 may comprise a rotor hub. Rotor 105 may include a shaft 125. Rotor 105 may be disposed within a retention sleeve 135 or a containment sleeve, for example.

FIG. 1 illustrates an interior rotor machine where stator 110 surrounds rotor 105. If permanent magnets and/or permanent magnet pole segments are adhered to rotor 105, a centrifugal force may subject the permanent magnets and/or permanent magnet pole segments on the rotor 105 outward, away from a center axis of the electrical machine 100 while the rotor 105 is rotating, for example. In order to maintain mechanical integrity of electrical machine 100, for example, a retention sleeve 135 may be utilized to prevent the permanent magnets and/or permanent magnet pole segments from separating from the rotor and coming into contact with a component external to electrical machine 100. A retention sleeve 135 may be formed of a non-magnetic stainless steel such as Inconel, a non-ferrous material such as titanium, carbon fiber, or fiberglass, for example.

In an implementation comprising an exterior rotor machine, a rotor may surround the stator. In such an implementation, a rotor sleeve, if present, may surround an outer surface of the rotor and may or may not be required, depending on rotor construction, application, and operating speed. An exterior rotor machine may include a sleeve on the interior (facing the stator), but this is not under hoop stress from the centrifugal forces and so is usually not called a "retention sleeve".

Referring back to FIG. 1, permanent magnets and/or permanent magnet pole segments may be mounted or otherwise affixed to an outer perimeter of a rotor hub. In the presence of a power source, a magnetic flux caused by the permanent magnets and/or permanent magnet pole segments disposed around the outer perimeter of the rotor hub may apply a torque on rotor 105. A rotor hub may comprise a multi-faceted exterior surface extending along a perimeter of the rotor hub. In one particular embodiment, each facet of a multi-faceted exterior surface has a substantially planar surface and is oriented substantially perpendicular to a radial line extending from an approximate center of the rotor hub.

Permanent magnets and/or permanent magnet pole segments may be selected for use with a rotor hub so that losses due to an unutilized portion of magnetic flux to generate a torque to rotate rotor are reduced, as discussed further below.

Figure 2A:
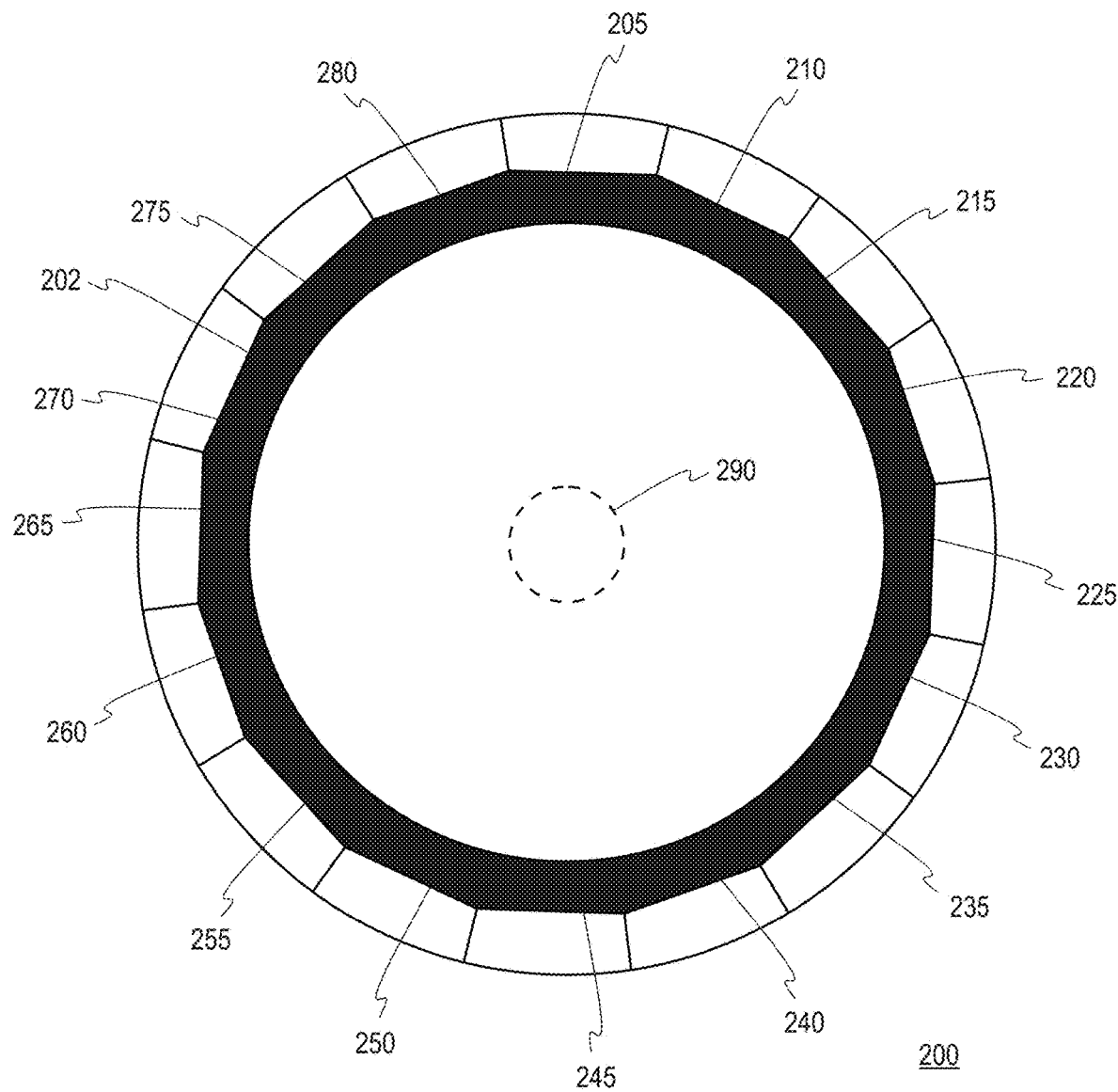
FIG. 2A illustrates an embodiment of a multi-faceted rotor hub in a rotor assembly of an interior rotor machine.

FIG. 2A illustrates an embodiment 200 of a multi-faceted rotor hub 202 in a rotor assembly. Embodiment 200 illustrates a multi-faceted rotor hub 202 in a rotor assembly of an interior rotor machine, for example, where a stator (not shown in FIG. 2A) of the interior rotor machine surrounds the multi-faceted rotor hub. Embodiment 200 may comprise a multi-faceted rotor hub 202 in which facets extend circumferentially around an outside edge of an outer perimeter of the multi-faceted rotor hub 202. A shaft, such as shaft 125 shown in FIG. 1, may extend through a shaft hole 290, for example. Embodiment 200 illustrates a multi-faceted rotor hub 202 having sixteen different facets, e.g., first facet 205, second facet 210, third facet 215, fourth facet 220, fifth facet 225, sixth facet 230, seventh facet 235, eighth facet 240, ninth facet 245, tenth facet 250, eleventh facet 255, twelfth facet 260, thirteenth facet 265, fourteenth facet 270, fifteenth facet 275, and sixteenth facet 280. In an embodiment, one or more of the facets may include a rotor hub ID, for example, it is noted that sixteen facets are illustrated in embodiment 200 of FIG. 2A for the sake of simplicity. It should be appreciated, however, that depending upon a particular application, a multi-faceted rotor hub 202 having more or fewer than sixteen facets may be utilized.

There are different types of multi-faceted rotor hubs. In one implementation, a multi-faceted rotor hub may include a relatively large number of facets for a relatively small number of poles for the multi-faceted rotor hub. For example, a "bread-loaf" style of multi-faceted rotor hub may be utilized where a gap is left between adjacent poles. In a "bread-loaf" type of multi-faceted rotor hub, for example, permanent magnet pole segments having the same polarity may be affixed to a plurality of adjacent facets. In one implementation, a multi-faceted rotor hub may include a total of two poles and permanent magnet pole segments across multiple facets are associated with each pole. Accordingly, a relatively large number of facets and permanent magnet pole segments are therefore associated with each of the two poles. Permanent magnet pole segments may not typically span 180 electrical degrees (e.g., one full pole pitch), for example, because a peripheral portion of the magnets may tend to oppose each other's magnet flux and increase costs for material and introduce losses in terms of use of magnet flux without providing a benefit in terms of magnetic flux-per-pole.

A "low-pole count machine," as used herein, refers to an electrical machine having a relatively small number of magnetic poles. In an implementation, a low-pole count machine may comprise an electrical machine having two, four, or six magnetic poles, depending on a use in a particular industry and/or for a particular application.

A "high-pole count machine," as used herein, refers to an electrical machine having a relatively large number of magnetic poles. In an implementation, a high-pole count machine may comprise an electrical machine having twelve or more magnetic poles. However, it should be appreciated that a number of poles in a high-pole count machine may be dependent upon a use in a particular industry and/or for a particular application. For example, twelve poles may be considered a low pole count for a hydro-generator which typically has more than fifty magnetic poles.

An implementation of a relatively high pole-count machine, for example, may be more restricted than a similarly sized low-pole count machine because, for example, physical components that make up each magnetic pole may tend to be smaller, proportional to the pole count. Additionally, a manufacturing process may tend to lengthen as a number of magnet pieces, poles, and/or facets increases. Accordingly, it may be advantageous in high pole-count machines to have a reduced number of facets, for example, to reduce manufacturing costs and simplify construction.

A permanent magnet assembly may be affixed or otherwise affixed to individual facets of the multi-faceted rotor hub. A "permanent magnet assembly," as used herein, refers to an assembly of two or more permanent magnets and/or permanent magnet pole segments. For example, a permanent magnet assembly may comprise at least a planar top surface and a planar bottom surface, and may comprise a combination of at least a first permanent magnet and/or permanent magnet pole segment having at least a portion of north-seeking pole or at least a portion of a south-seeking pole disposed on the top surface in a direction substantially normal to the planar top surface, and at least a second permanent magnet and/or permanent magnet pole segment having at least a portion of a pole disposed in a direction other than substantially normal to the planar top and/or planar bottom surface. In one particular embodiment, a permanent magnet assembly may comprise a first permanent magnet and/or permanent magnet pole segment having at least a portion of a north-seeking pole or at least a portion of a south-seeking pole disposed at the top planar surface of the permanent magnet assembly in a direction substantially normal to the planar top surface and a second permanent magnet and/or permanent magnet pole segment having at least a portion of a pole disposed in a direction substantially orthogonal to the planar top surface. Such a second permanent magnet and/or permanent magnet pole segment having at least a portion of a pole disposed in a direction substantially orthogonal to the planar top surface may comprise an "interpole" permanent magnet and/or an interpole permanent magnet pole segment. An "interpole" permanent magnet and/or permanent magnet pole segment, as used herein, refers to a permanent magnet and/or permanent magnet pole segment which in polarized in a direction other than substantially normal to a planar top surface or planar bottom surface of the interpole permanent magnet and/or permanent magnet pole segment. In one particular embodiment, an interpole permanent magnet may be polarized in a direction substantially orthogonal to the planar top surface of the interpole permanent magnet, such as substantially orthogonal to a plane extending along a top surface of permanent magnet assembly, for example.

For example, if a permanent magnet assembly has a first permanent magnet having a north-seeking pole or a south-seeking pole disposed on the planar top surface of the permanent magnet assembly in a direction substantially normal, or at an approximately 90° angle with respect to the planar top surface, the permanent magnet assembly may further include a second permanent magnet and/or permanent magnet pole segment which comprises an interpole permanent magnet and/or permanent magnet pole segment. In one particular embodiment, an interpole magnet segment may be polarized in a direction substantially parallel to the plane on the top surface of the permanent magnet assembly. Accordingly, respective polarizations of the first and second permanent magnets and/or permanent magnet pole segments may therefore differ by approximately 90°.

Figure 2B:
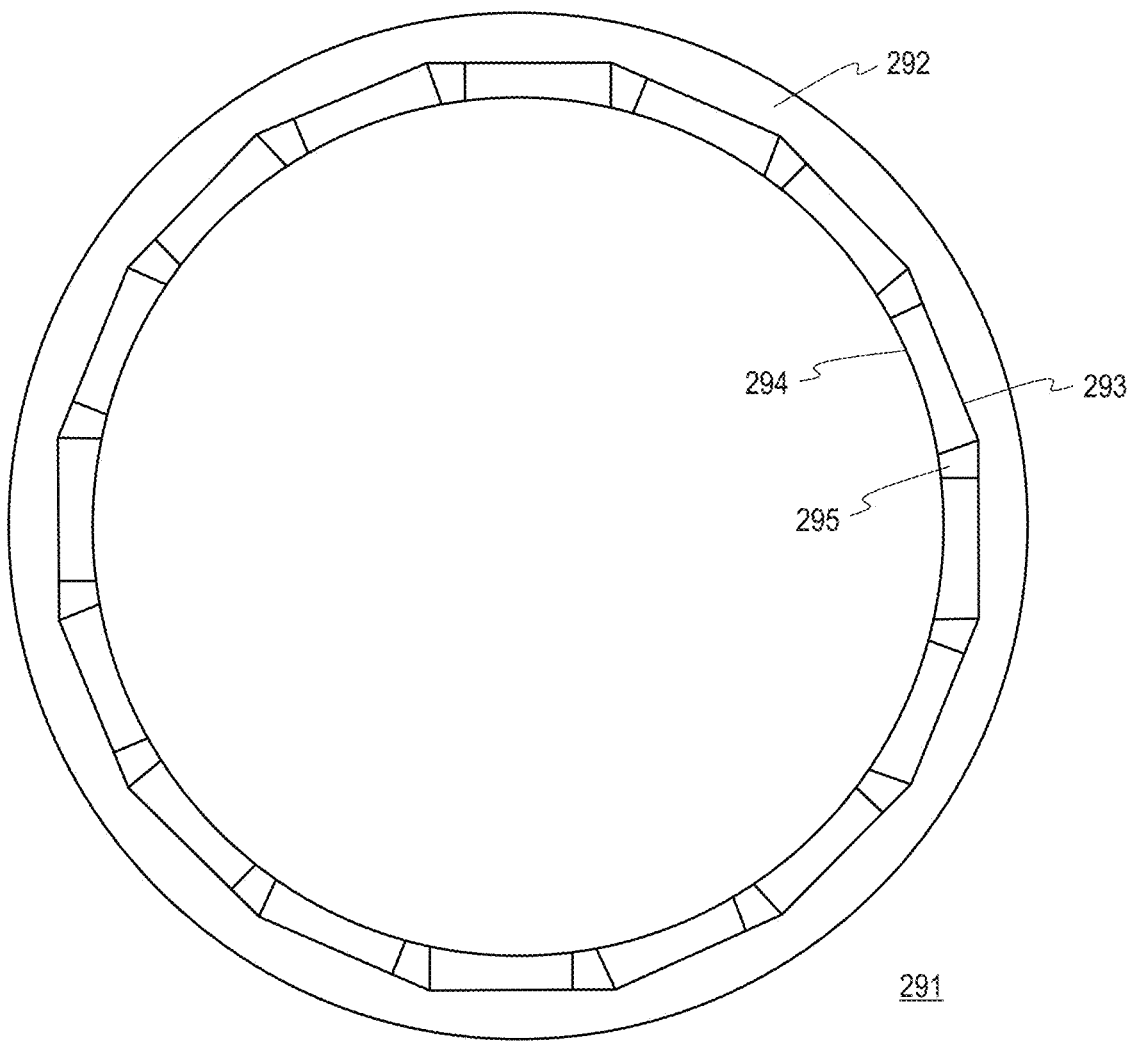
FIG. 2B illustrates an embodiment of a multi-faceted rotor hub in a rotor assembly of an exterior rotor machine.

FIG. 2B illustrates an embodiment 291 of a multi-faceted rotor hub 292 in a rotor assembly. Embodiment 291 illustrates a multi-faceted rotor hub 292 of an exterior rotor machine, for example, where a stator (not shown in FIG. 2B) of the exterior rotor machine surrounds the multi-faceted rotor hub 292. Embodiment 291 includes a plurality of facets 293 which are disposed along an interior perimeter of the multi-faceted rotor hub 292, instead of along an exterior perimeter of the multi-faceted rotor hub 292, such as is shown in embodiment 200 of FIG. 2A. In embodiment 291, one permanent magnet assembly 294 and one filler material portion 295 may be affixed to each facet 293 of rotor hub 292, for example. For example, filler material portion 295 may be utilized to fill in a gap between edges of adjacent permanent magnets and/or permanent magnet pole segments. A "filler material portion" or "gap material," as used herein, refers to a material disposed adjacent to or between one or more permanent magnet and/or permanent magnet pole segments. For example, a filler material portion may comprise a non-magnetic material disposed around or adjacent to at least a portion of a permanent magnet and/or permanent magnet pole segment. A filler material portion may comprise a segment of solid material in some implementations, but may be at least partially hollow in other implementations. A filler material portion may be utilized instead of increasing a relative size of adjacent permanent magnets and/or permanent magnet pole segments so that the permanent magnets and/or permanent magnet pole segments are disposed with adjacent edges flush against each other, for example, to reduce material costs and simplify a process of manufacturing a multi-faceted rotor hub to which permanent magnets and/or permanent magnet pole segments are affixed. For example, because a magnetic force between adjacent magnets and/or permanent magnet pole segments may repel or attract such permanent magnets and/or magnet segments, adverse effects caused by these magnetic forces may be reduced by utilizing a non-magnetic filler material portion between the two adjacent permanent magnets and/or permanent magnet pole segments, for example.

According to an embodiment, a filler material may be disposed between permanent magnets and/or permanent magnet pole segments to realize certain advantages. For example, a filler material may provide a structure to provide support to an adjacent permanent magnet adhered to a rotor during an initial assembly of an electrical machine. For example, permanent magnets may be adhered to a rotor and may subsequently be grinded into a desired shape or dimensions prior to encapsulating the electrical machine within a containment sleeve. Use of filler material while permanent magnets are being grinded into a desired shape may provide benefits such as limiting or reducing chipping and cracking of the permanent magnets. Filler material may also reduce a stress riser on a retention sleeve. Filler material may additionally provide a solid material to prevent displacement of pieces of permanent magnets if, for example, the pieces crack during operation. Filler material may also take up or absorb manufacturing/assembly tolerances.

In a particular implementation, an interpole permanent magnet and/or magnet segment may be adhered to a facet instead of a filler material portion 295, for example. In such an implementation, a permanent magnet assembly 294 may comprise a north-seeking pole or a south-seeking pole oriented in a direction substantially normal to a surface of a facet 293 onto which the permanent magnet assembly is affixed or adhered.

Figure 3:
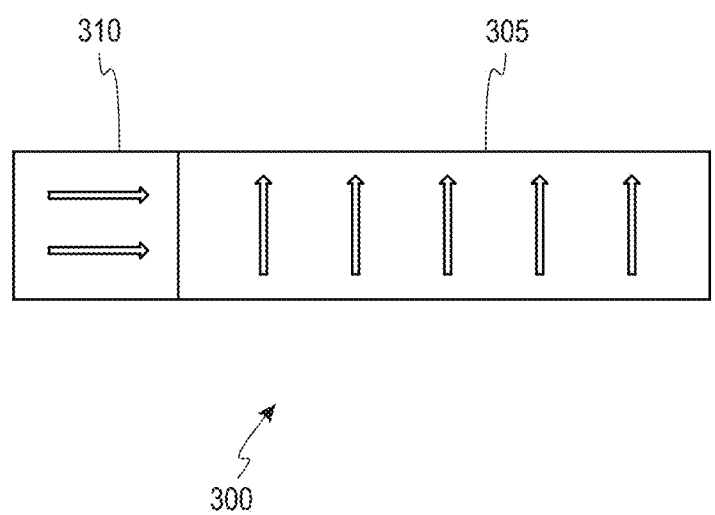
FIG. 3 illustrates a permanent magnet assembly according to an embodiment.

FIG. 3 illustrates an assembly 300 of permanent magnets according to an embodiment. As illustrated, assembly 300 includes a first permanent magnet 305 and a second magnet segment 310. First permanent magnet 305 may comprise a north-seeking pole oriented in a direction substantially normal to and away from a planar top surface of the assembly 300, for example. Second permanent magnet 305 may comprise an interpole permanent magnet which is polarized in a direction other than substantially parallel to a top surface or bottom surface of the assembly 300. In one particular implementation, second permanent magnet 310 may comprise an interpole permanent magnet polarized in a direction substantially orthogonal to a direction of magnetization of first permanent magnet 305. For example, second permanent magnet 310 may be polarized on a direction that is substantially parallel to a planar top or bottom surface of second permanent magnet 310.

In the example shown in FIG. 3, first permanent magnet 305 may have a volume or size different from that of second permanent magnet 310. In the example shown in FIG. 3, first permanent magnet 305 and second permanent magnet 310 may have different widths but similar heights and similar depths, although depths are not shown in FIG. 3 for the sake of simplicity. Although only two permanent magnets, e.g., first permanent magnet 305 and second permanent magnet 310, are shown in FIG. 3, it should be appreciated that in some applications, three or more permanent magnets and/or permanent magnet pole segments may be included in assembly 300. Arrows within a permanent magnet shown in FIG. 3 may, for example, indicate a direction of magnetization of the permanent magnet. In an embodiment shown in FIG. 3, assembly 300 may include a relatively flat bottom and/or top planar surface so that, for example, the assembly 300 may be readily affixed to a facet of a rotor hub. Assembly 300 may comprise a shape approximating a rectangular prism, for example, to enable simpler manufacture and/or machining of permanent magnets and/or permanent magnet pole segments. For example, if multiple permanent magnets and/or permanent magnet pole segments are to be affixed to various facets of a rotor hub, a manufacturing process may be simplified if each permanent magnet and/or permanent magnet pole segment has a shape approximating a rectangular prism.

Individual facets of a rotor hub in accordance with embodiment 200 may have an approximately flat external surface, as pointed out above. Permanent magnets of assembly 300 may have approximately flat or planar bottom surfaces which may be affixed or otherwise attached to corresponding flat or planar external surfaces of facets of a rotor hub in accordance with embodiment 200. For example, assembly 300 may be glued, soldered, welded, or otherwise adhered onto external surfaces of individual facets of a rotor hub in accordance with embodiment 200. In an embodiment, assembly 300 may be mechanically captured and retained by retention or containment sleeves or brackets, for example. In a particular implementation, an adhesive may be used during manufacture to facilitate assembly of permanent magnets, but such adhesives may not be considered as a structural element. In accordance with a particular embodiment, one permanent magnet may be affixed to each individual facet of a multi-faceted rotor hub.

Figure 4A:
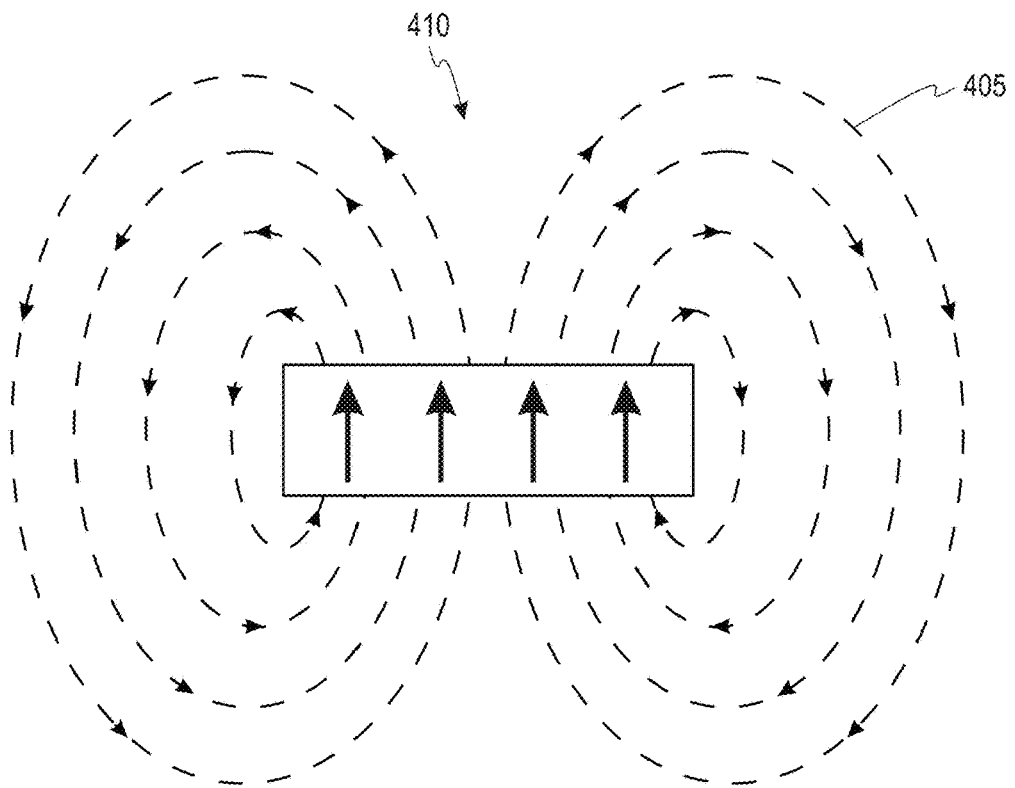
FIGS. 4A-4B illustrate magnetic flux distributions for a permanent magnet assembly.
Figure 4B:
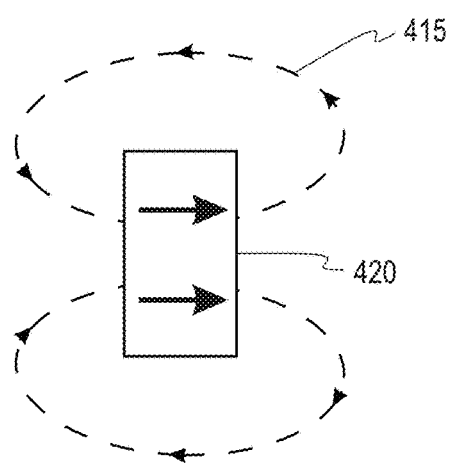

FIGS. 4A-4B illustrate magnetic flux distributions for a permanent magnet and/or permanent magnet pole segment according to an embodiment. FIG. 4A illustrates a magnetic flux distribution 405 for a first permanent magnet 410 having a north-seeking pole disposed on the top surface of the first magnet segment 410 in a direction substantially normal to a planar top surface. For example, the dashed line segments may comprise magnetic field lines of a magnetic field and arrows within the magnetic field lines may indicate a direction of magnetic flux. A magnetic field line may comprise a contour of a vector of magnetic potential, for example. A magnetic flux through a surface may be modeled by or behave according to a surface integral of a normal component of a magnetic field passing through that surface.

Magnetic flux through any point on a surface of first permanent magnet 410 may comprise a component of a magnetic field along this direction. A magnetic interaction may be described in terms of a vector field, where points in space (and time) are associated with a vector that determines a force which a moving charge would experience at that point. A magnetic flux through a particular surface, in this example, may be proportional to a number of field lines passing through that surface (in some contexts, a flux may be defined to be precisely a number of field lines passing through a surface). Magnetic flux may comprise a net number of field lines passing through a surface, such as a number passing through in one direction minus a number passing through in an opposing direction.

As shown in FIG. 4A, magnetic flux lines for a magnetic flux distribution 405 may extend from a magnetic north-seeking pole direction to a side opposite the magnetic north-seeking pole direction of first permanent magnet 410.

FIG. 4B illustrates a magnetic flux distribution 415 for an interpole permanent magnet pole segment 420. For example, interpole permanent magnet pole segment 420 may be polarized in a direction substantially orthogonal to that of a magnetic north-seeking pole direction. As shown in FIG. 4B, magnetic flux lines for a magnetic flux distribution 415 may extend from a direction out of a right side of interpole permanent magnet pole segment 420 over to an opposing side of interpole permanent magnet pole segment 420.

Figure 4C:
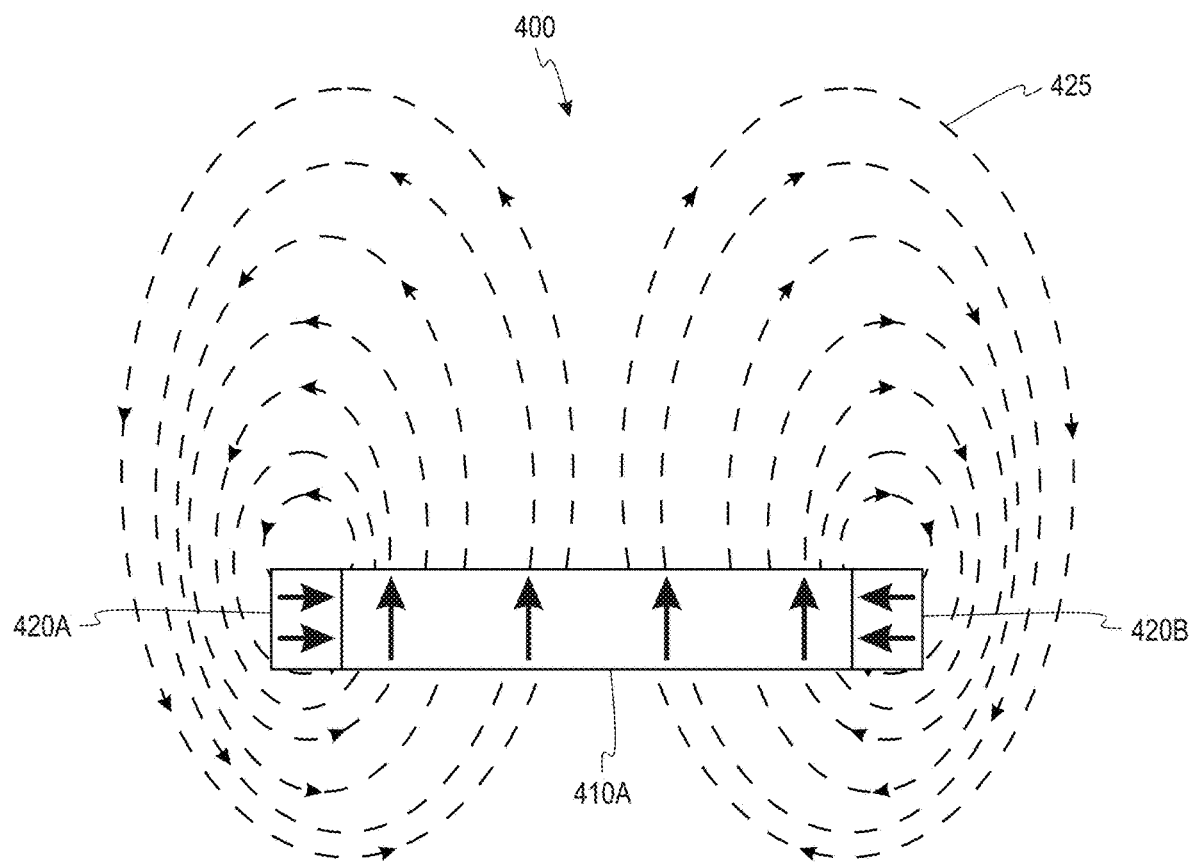
FIG. 4C illustrates a magnetic flux distribution for a permanent magnet assembly.

FIG. 4C illustrates a magnetic flux distribution 425 for an assembly 400 of a permanent magnet 410A polarized in a magnetic north-seeking direction and interpole permanent magnet pole segments 420A and 420B according to an embodiment. A shown, permanent magnet 410A may be similar to first permanent magnet 410 shown in FIG. 4A. Interpole permanent magnet pole segment 420A may be similar to interpole permanent magnet pole segment 420 shown in FIG. 4B. Interpole permanent magnet pole segment 420B may be similar to interpole permanent magnet pole segment 420 shown in FIG. 4B but may be positioned so that it is polarized in a direction 180° different from interpole permanent magnet pole segment 420. In an embodiment, for example, magnetic flux distribution 425 for assembly 400 may be determined by combining magnetic flux distributions for permanent magnet 410A and interpole permanent magnet pole segments 420A and 420B. For example, magnetic flux distribution 425 may skew in a direction orthogonal to a top surface of the assembly 400. A direction of magnetic flux distribution and amount of skew may be based, at least in part, on relative strength of permanent magnet 410A and interpole permanent magnet pole segments 420A and 420B, for example.

A rotor hub may comprise a ferrous material such as steel. Use of a ferrous material may, for example, improve a flux density of a rotor onto which permanent magnets and/or permanent magnet pole segments have been affixed or adhered, for example. As discussed above, FIG. 4C illustrates a magnetic flux distribution 425 for an assembly 400 of permanent magnets and/or permanent magnet which are in "free space" or are otherwise not affixed or adhered to another object. However, if assembly 400, for example, is affixed or adhered to an outer perimeter of a rotor hub, the rotor hub may include or be formed of a material which may include its own magnetic flux distribution. For example, if a rotor hub is comprised of a ferrous material such as steel, the rotor hub may include its own magnetic flux distribution which may combine with a magnetic flux distribution 425 of assembly 400 if assembly 400 is adhered to one or more facets of an outer perimeter of the rotor hub. An effect of a magnet flux density of a material comprising an outer core of a rotor onto which polarized magnetic segments have been adhered is discussed further with respect to FIGS. 11A-C and 12A-C.

FIGS. 5A-5H illustrate various configurations for permanent magnet assemblies. For example, eight different configurations are shown in cross-section in FIGS. 5A-H.

Figure 5A:
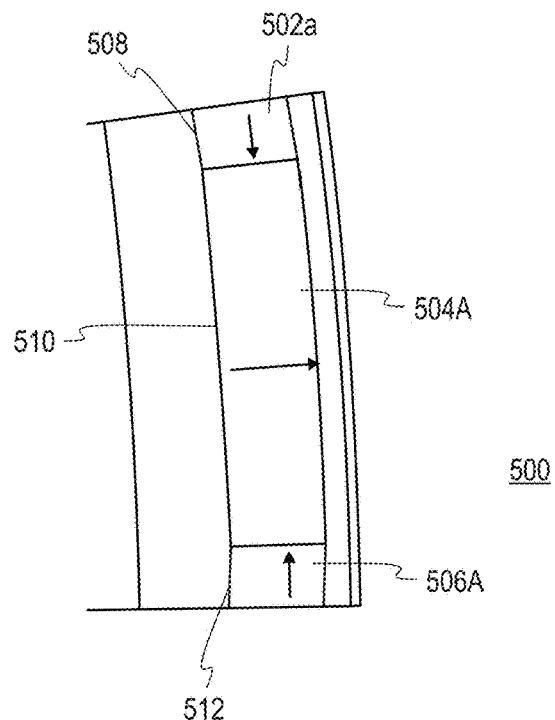
FIGS. 5A-5H illustrate various configurations for permanent magnet assemblies.

FIG. 5A illustrates an embodiment 500 of a permanent magnet assembly which extends along multiple facets of a rotor hub. In this example, an assembly is comprised of a first interpole permanent magnet 502A which is polarized in a direction parallel to a surface of a facet 508 onto which it is adhered, a permanent magnet 504A polarized in a magnetic north-seeking pole direction which is orthogonal to a surface of a facet 510 onto which it is adhered, and a second interpole permanent magnet 506A which is polarized in a direction parallel to a surface of a facet 512 onto which it is adhered. As shown, first and second interpole permanent magnets 502A, 506A are polarized in directions which are orthogonal to a direction to which second permanent magnet pole segment 504A is polarized. In embodiment 500, first interpole permanent magnet t 502A, permanent magnet 504A, and second interpole permanent magnet 506A are each affixed or adhered to different facets of a rotor hub. For example, as discussed above, first interpole permanent magnet 502A may be affixed to first facet 508, permanent magnet 504A may be affixed to second facet 510, and second permanent magnet 506A may be affixed to third facet 512.

In embodiment 500 of FIG. 5A, one pole of a multi-pole machine, such as a 48-pole machine, is illustrated, for example. In embodiment 500, a 48-pole rotor may include 96 facets and a total of 96 permanent magnets, 48 of which are north-seeking or south-seeking, and 48 of which comprise interpole permanent magnets. In embodiment 500, for the sake of simplicity, only half of first facet 508 and of first interpole permanent magnet 502A are illustrated. Similarly, only half of third facet 512 and of second interpole permanent magnet pole segment 506A are illustrated as well.

In embodiment 500, permanent magnets may not be exactly rectangular. Instead, for example, one or more permanent magnets may have a small angle of curvature so that outer edges of permanent magnets fit line-to-line corresponding outer edges of adjacent permanent magnets. For example, if edges of two permanent magnets fit line-to-line, the edges may be approximately directly adhered to each other. For example, in embodiment 500, permanent magnet 504A fits line-to-line against first interpole permanent magnet 502A and also fits line-to-line against second interpole permanent magnet 506A.

Figure 5B:
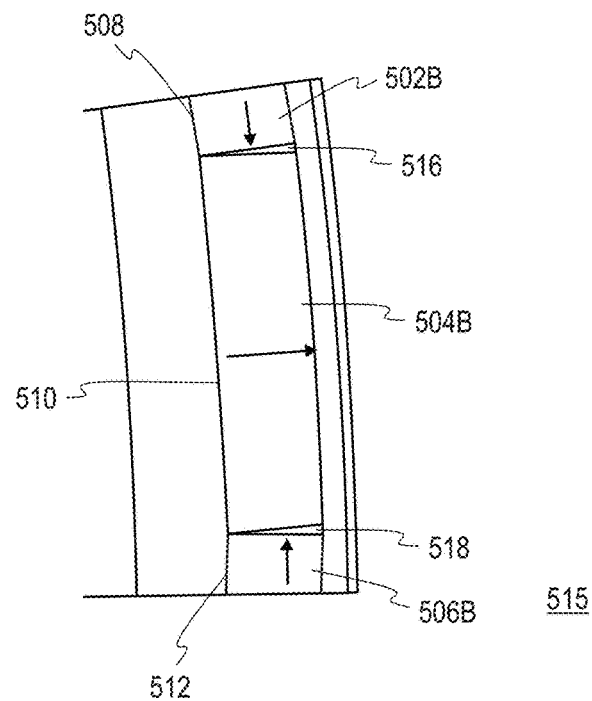

FIG. 5B illustrates an embodiment 515 of a permanent magnet assembly which extends along multiple facets of a rotor hub. Embodiment 515 of FIG. 5B is similar to embodiment 500 of FIG. 5A, except that permanent magnets have an approximately rectangular prism shape instead of having an angle of curvature, for example. If a permanent magnets have an approximately rectangular prism shape, for example, then if positioned around a rotor, edges of the permanent magnet pole segments may not fit line-to-line with corresponding edges of adjacent permanent magnet pole segments. Accordingly, a filler material may be utilized to fill in a gap between edges of adjacent permanent magnets. For example, a first filler material portion 516 or gap material may be utilized between first interpole permanent magnet 502B and permanent magnet 504B, and a second filler material portion 518 or gap material may be disposed between the permanent magnet 504B and second permanent magnet 5068.

Figure 5C:
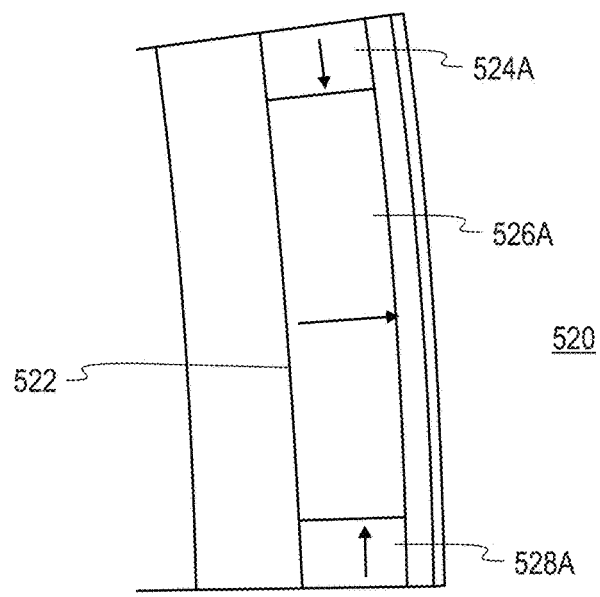

FIG. 5C illustrates an embodiment 520 of a permanent magnet assembly which extends along a single facet of a rotor hub. In this example, a permanent magnet assembly may be comprised of a first interpole permanent magnet pole segment 524A which is polarized in a direction parallel to a surface of a facet 522 onto which it is adhered, permanent magnet 526A which is polarized in a magnetic north-seeking pole direction which is orthogonal to a surface of facet 522, and a second interpole permanent magnet pole segment 528A which is polarized in a direction parallel to a surface of a facet 522. As shown, first and second interpole permanent magnet pole segments 524A, 528A are polarized in directions which are substantially orthogonal to a direction to a magnetic north-seeking direction which permanent magnet 526A is polarized.

Embodiment 520 illustrates one pole of a multi-pole machine, such as a 48-pole machine, for example. In embodiment 520, a 48-pole rotor may include 48 facets and a total of 144 magnet pieces—e.g., 96 interpole permanent magnet pole segments and 48 permanent magnets segments which are polarized in a magnetic north-seeking pole direction which is orthogonal to a surface of respective facets onto which they are adhered.

In embodiment 520, permanent magnet 526A fits line-to-line against first interpole permanent magnet pole segment 524A and also fits line-to-line against second interpole permanent magnet pole segment 528A.

Figure 5D:
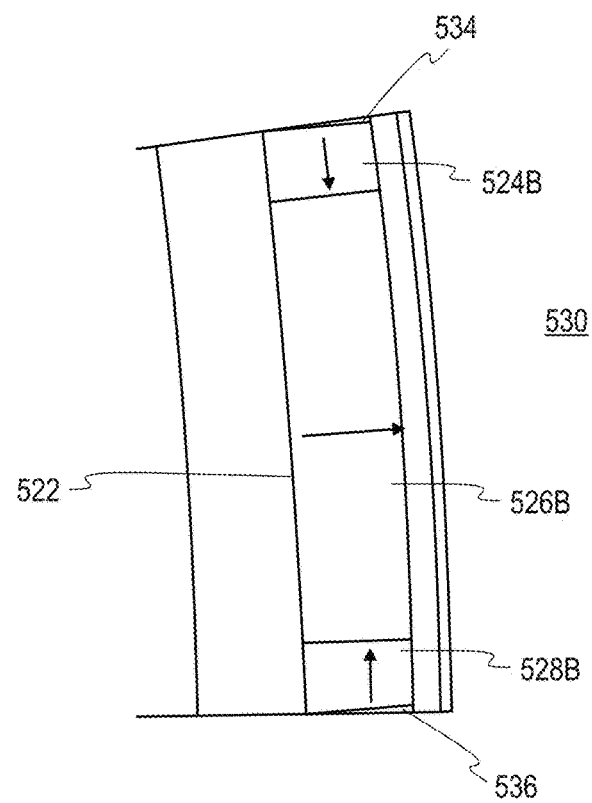

FIG. 5D illustrates an embodiment 530 of a permanent magnet assembly which extends along a single facet 522 of a rotor hub. Embodiment 530 of FIG. 5D is similar to embodiment 520 of FIG. 5C, except that an addition of first filler material portion 534 may be disposed between first interpole permanent magnet pole segment 524B and an interpole permanent magnet pole segment on an adjacent facet, and a second filler material portion 536 may be disposed between second interpole permanent magnet pole segment 528B and an interpole permanent magnet pole segment on another adjacent facet. First and second filler material portions 534, 536 may comprise a non-magnetic material, such as discussed above with respect to FIG. 5B.

Figure 5E:
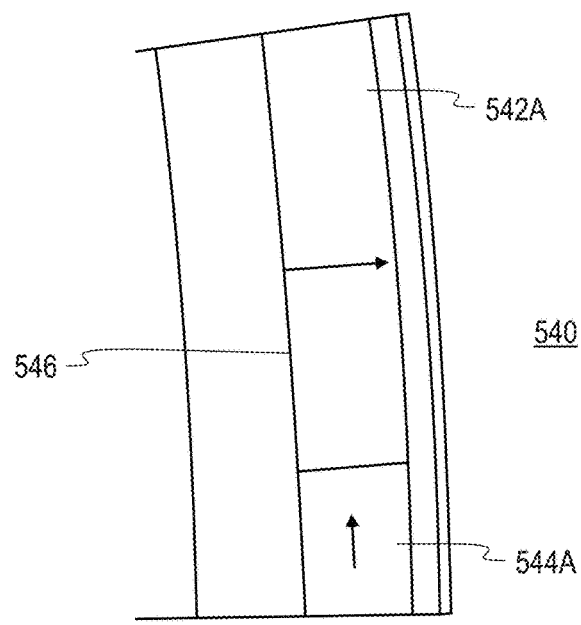

FIG. 5E illustrates an embodiment 540 of a permanent magnet assembly which extends along a single facet of a rotor hub. In this example, the permanent magnet assembly is comprised of a permanent magnet pole segment 542A which is polarized in a magnetic north-seeking direction, and an interpole permanent magnet pole segment 544A. A permanent magnet assembly in accordance with embodiment 540 may be affixed to a single facet 546.

Figure 5F:
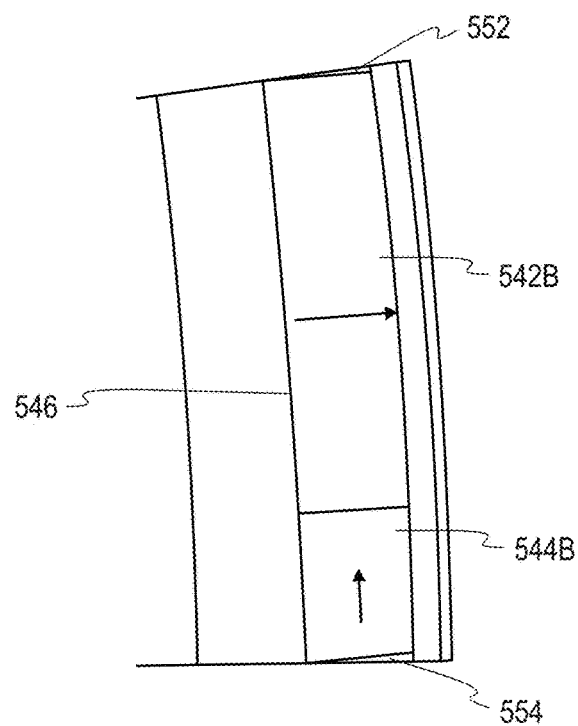

FIG. 5F illustrates an embodiment 550 of a permanent magnet assembly which extends along a single facet of a rotor hub. Embodiment 550 of FIG. 5F is similar to embodiment 540 of FIG. 5E, except that there is an addition of filler material portion 552 between permanent magnet 542B and a permanent magnet on an adjacent facet, and filler material 554 is disposed between interpole permanent magnet 544B and a permanent magnet on another adjacent facet. Filler material portion 552 may comprise a non-magnetic material, such as discussed above with respect to FIGS. 5B and 5D.

Embodiment 540 and 550 each illustrate one pole of a multi-pole machine, such as a 48-pole machine, is illustrated, for example. In embodiment 540 and 550, a 48-pole rotor may include 48 facets and a total of 96 magnet segments. Of the 96 permanent magnets, 48 may be north-seeking or south-seeking and 48 may comprise interpole permanent magnet.

Figure 5G:
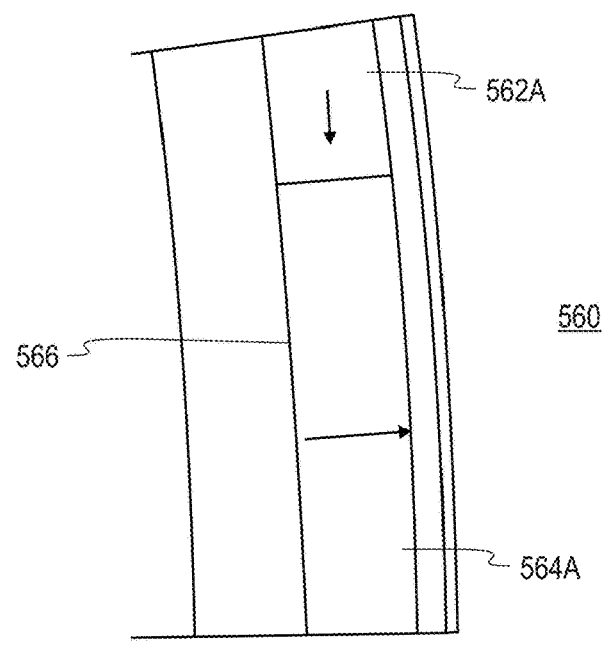

FIG. 5G illustrates an embodiment 560 of an assembly that includes a permanent magnet assembly which extends along a single facet of a rotor hub. In embodiment 560, the assembly may be comprised of an interpole permanent magnet 562A, and a permanent magnet 564A which is polarized in a magnetic north-seeking pole direction. A permanent magnet assembly in accordance with embodiment 560 may be affixed to a single facet 566. As shown, embodiment 560 of FIG. 5G is similar to embodiment 540 of FIG. 5E, except that positions of an interpole permanent magnet and of a permanent magnet polarized in a magnetic north-seeking pole direction are reversed, for example.

Figure 5H:
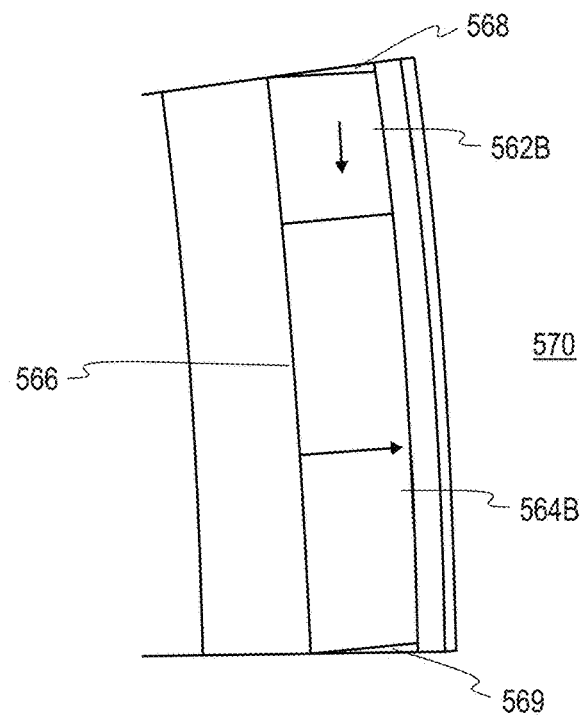

FIG. 5H illustrates an embodiment 570 of a permanent magnet assembly which extends along a single facet of a rotor hub. Embodiment 570 of FIG. 5H is similar to embodiment 560 of FIG. 5G, except that there is an addition of filler material portion 568 between interpole permanent magnet 562B and a permanent magnet pole segment on an adjacent facet, and a filler material 569 is disposed between permanent magnet 564B and a permanent magnet on another adjacent facet. Filler material portion 568B may comprise a non-magnetic material, such as discussed above with respect to FIGS. 5B, 5D, and 5F. As shown, embodiment 570 of FIG. 5H is similar to embodiment 560 of FIG. 5G, except that positions of an interpole permanent magnet and of a permanent magnet polarized in a magnetic north-seeking pole direction are reversed, for example.

In the configurations shown in FIGS. 5A-H, permanent magnets and/or permanent magnet pole segments may have a fully rectangular prism shape or dimensions in accordance with an embodiment. However, in some implementations, a permanent magnet and/or a permanent magnet pole segment may comprise a shape which is rounded or has some other non-fully rectangular prism shape which may correspond to a shape of a rounded rotor hub, for example.

Different configurations in accordance with FIGS. 5A-H may comprise left-handed and/or right-handed configurations. One or more configurations may be utilized for performance impact relative to a direction of rotation of a rotor hub and/or may be selected based, at least in part, on whether an electrical machine is operating as a motor or generator, for example.

A multi-faceted rotor hub may provide advantages over a round rotor hub which lacks facets in accordance with one or more implementations. For example, a flat-to-flat interface between a flat facet and a corresponding flat permanent magnet face may enable a simpler manufacturing operation than would be possible if a rotor hub and permanent magnets and/or permanent magnet pole segments are each rounded or arched and are machined separately to matching diameters. For example, it may be more cost-effective to extract permanent magnets and/or segments having a substantially rectangular prism shape and with less wasted or unused permanent magnet material from a sheet or segment of permanent magnet material than it would be to extract magnet segments having rounded or arched surfaces.

For example, if a rotor has a round or arched outer perimeter, instead of using relatively flat facets, permanent magnets and/or permanent magnet pole segments may be machined to match the arch of the rotor hub, such as discussed above wither respect to FIGS. 10A-C. Machining a rotor hub and permanent magnets and/or segments to particular arches or rounded dimensions, however, may result a multi-faceted rotor being more susceptible to cracked permanent magnets and/or segments due to unmatched surfaces or interfaces over the life of the parts such as, for example, if a measurement of curvature of an arch of a permanent magnet and/or segment differs or deviates from a measurement of an arch of a rotor hub.

A total number of facets on a rotor hub may be reduced to reduce a number of corresponding manufacturing steps and associated costs. For example, if two permanent magnets correspond to a single pole, instead of using more than eleven poles as discussed above with respect to an embodiment shown in FIG. 2B, a number of facets on a rotor hub may therefore be reduced. North-seeking and south-seeking permanent magnets and interpole permanent magnets and/or segments sharing a common interface may be mated (e.g., adhesively bonded) to form a permanent magnet assembly, such as discussed above, to reduce a number of magnet-to-rotor hub bonding or affixing operations, for example. A permanent magnet assembly which comprises a rectangular prism shape and includes a rectangular prism north-seeking or south-seeking magnet segment and a single interpole permanent magnet may, for example, fully fill an interstitial space between permanent magnets, to provide more flux per-pole, a more uniform loading of the rotor retention sleeve, and a reduced number of interpole permanent magnets and/or segments. It is further noted that a machine operation to extract a north-seeking, south-seeking, or interpole permanent magnet and/or segment may be simpler to perform. For example, it may be easier to perform machining operations to cut at 90° angles, for example, than it may be to cut along a curved arch because it may be easier to hold and maintain tight tolerances to cut at the 90° angle than it may be to cut along the curved arch.

A multi-faceted rotor hub may be advantageous for use in a relatively high pole-count machine, for example. A multi-faceted rotor hub may be of particular value in an implementation where a power density and uniform load of a retention sleeve encapsulating a rotor hub, for example, is to be utilized. For example, a multi-faceted rotor hub may be utilized for a propulsion motor of a hybrid-electric aircraft.

Figure 6:
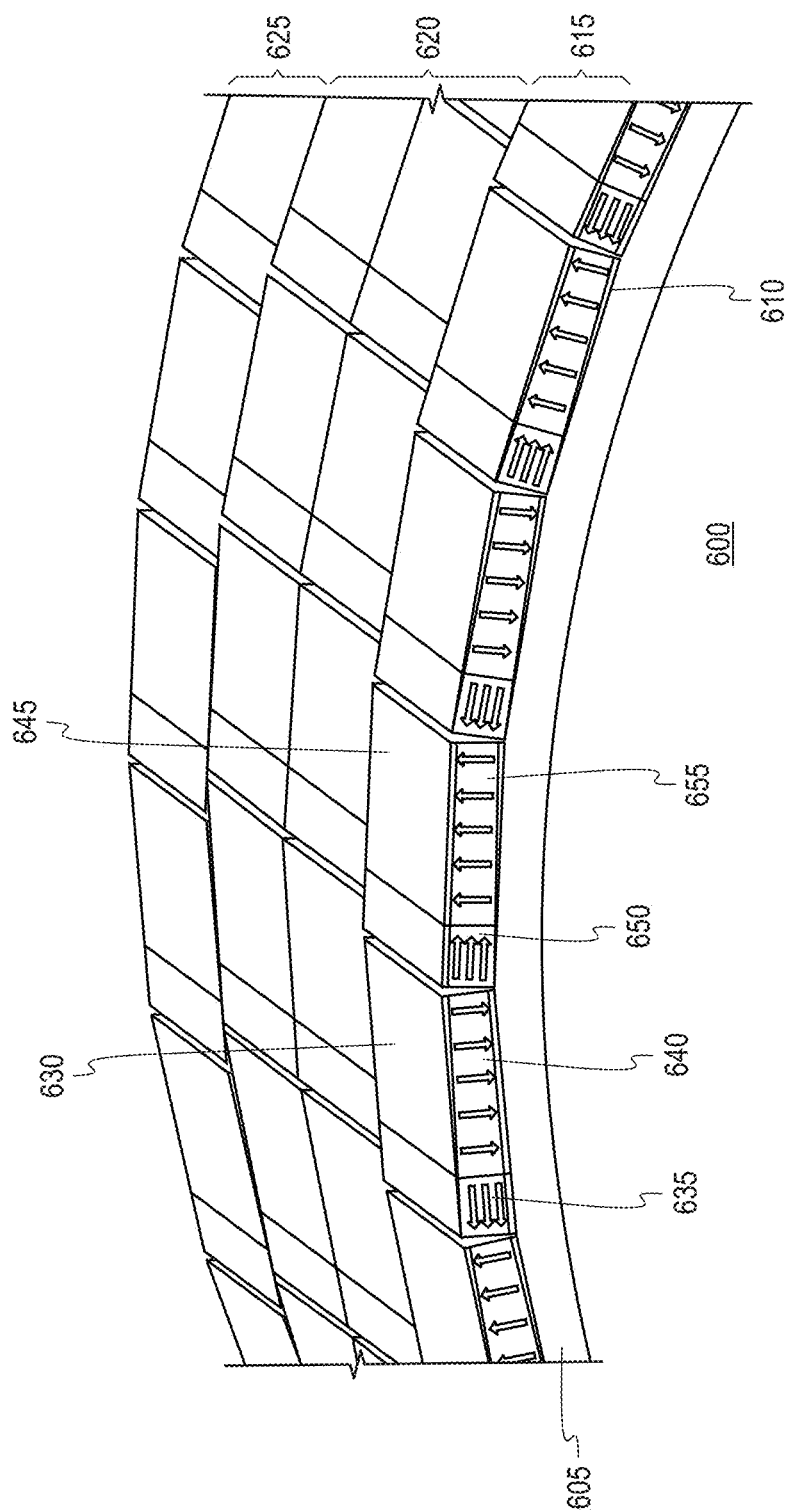
FIG. 6 illustrates an embodiment of a multi-faceted rotor assembly prior to sleeving.

FIG. 6 illustrates an embodiment 600 of a rotor assembly 605 prior to sleeving. Rotor assembly 605 may include a plurality of facets 610, where a permanent magnet assembly is affixed to individual facets 610. There are three rows of polarized magnets shown in embodiment 600, e.g., a first row 615, a second row 620, and a third row 625, each of which may extend around an outer perimeter of rotor assembly 605. In a particular implementation, first row 615 and third row 625 may have similar depths, whereas second row may be approximately twice as deep as first two 615 and third row 625. A permanent magnet assembly may be affixed to each facet of first row 615 and third row 625. Two permanent magnet assemblies may be affixed to facets of second row 620 to account for an increased depth of second row 620. In some implementations, a permanent magnet assembly having a depth of approximately twice that of permanent magnet assemblies utilized for first and third twos 615, 625 may be utilized for facets in second row 620 to account for an increased depth of second row 620.

As shown, permanent magnet assemblies of embodiment 600 include one permanent magnet which is either polarized in a north-seeking or south-seeking direction and an interpole permanent magnet which is polarized in a direction substantially orthogonal to the north-seeking or south-seeking direction of magnetization of the adjacent permanent magnet. In one particular implementation, for example, a permanent magnet may be considered to be either polarized in a north-seeking or south-seeking direction if a direction of polarization of the permanent magnet is substantially normal or perpendicular to a flat and planar surface of a facet onto which the permanent magnet is affixed or adhered, for example. In one particular implementation, a permanent magnet may be considered to be either polarized in a north-seeking direction if a direction of polarization of the permanent magnet is substantially normal to a flat and planar surface of a facet onto which the permanent magnet is affixed or adhered and is in a direction opposing a center axis of a rotor hub onto which the facet is affixed, for example. In one particular implementation, a permanent magnet may be considered to be either polarized in a south-seeking direction if a direction of polarization of the permanent magnet is substantially normal to a flat and planar surface of a facet onto which the permanent magnet is affixed or adhered and is in a direction toward a center axis of a rotor hub to which the facet is affixed, for example. In a particular implementation, an interpole permanent magnet may be considered to be polarized in a direction which is substantially parallel to a flat and planar surface of a facet onto which the interpole permanent magnet is affixed or adhered, for example.

Permanent magnet assemblies which include a combination of a first permanent magnet polarized in a north-seeking or south-seeking direction and a second, interpole permanent magnet pole segment which is polarized in a direction substantially orthogonal to the north-seeking or south-seeking direction of magnetization of the first permanent magnet may be utilized, for example, to improve a magnetic flux density profile for an electrical machine. For example, permanent magnets may be selected and affixed in a particular orientation around a perimeter of a rotor hub to generate an improved magnetic flux density profile to assist in generating a torque, for example. In one implementation, for example, a first permanent magnet assembly 630 includes an interpole permanent magnet 635 and a south-seeking permanent magnet 640. As illustrated, interpole permanent magnet pole segment 635 may be polarized in a direction different from that of south-seeking permanent magnet 640, such as in a direction substantially orthogonal to a direction of magnetization of south-seeking permanent magnet 640. A second permanent magnet assembly 645 may include an interpole permanent magnet 650 and a permanent magnet 655 polarized in a direction of a north-seeking pole. As illustrated, interpole permanent magnet 650 may be polarized in a direction toward permanent magnet pole segment 655, such as in a direction substantially orthogonal to a direction of magnetization of permanent magnet pole segment 655. An interpole permanent magnet pole segment of a permanent magnet assembly may have a volume less than that of a permanent magnet polarized in a north or south direction, such as is illustrated in embodiment 600 of FIG. 6. Particular dimensions of an interpole permanent magnet pole segment and of a permanent magnet having a north- or south-seeking pole may be selected or otherwise determined based, at least in part, on a particular application. For example, particular dimensions may be determined based, at least in part, on a design to produce magnetic flux distribution which is improved for a particular application. For example, an orientation of various permanent magnets may be utilized which produce an overall magnetic flux distribution for a rotor hub which minimizes excess heat produced as a result of magnetic flux, for example. For example, a magnetic flux distribution may be affected by a positioning of permanent magnets, both around a circumference of a row of facets, and by placement of particular permanent magnets in different rows of facets in an implementation having more than one row of facets on a rotor hub. For example, as discussed above with respect to FIG. 3, a magnetic flux distribution for one permanent magnet assembly may be summed with magnetic flux distributions of other permanent magnet assemblies affixed to a rotor hub to determine an overall magnetic flux distribution for the rotor hub.

As illustrated in FIG. 6, a rotational shift is utilized between some rows of facets. For example, a rotational shift between layers of permanent magnet assemblies affixed to facets of a rotor hub in the example shown in FIG. 6 is equal to one-half of a stator slot pitch. Such an arrangement may be referred to as a "¼-½-¼ stepped skew". A sleeve may be placed over a rotor hub and corresponding permanent magnet pole segments shown in FIG. 6. It should be appreciated that in some implementations, different rows may not be rotationally shifted.

Figure 7:
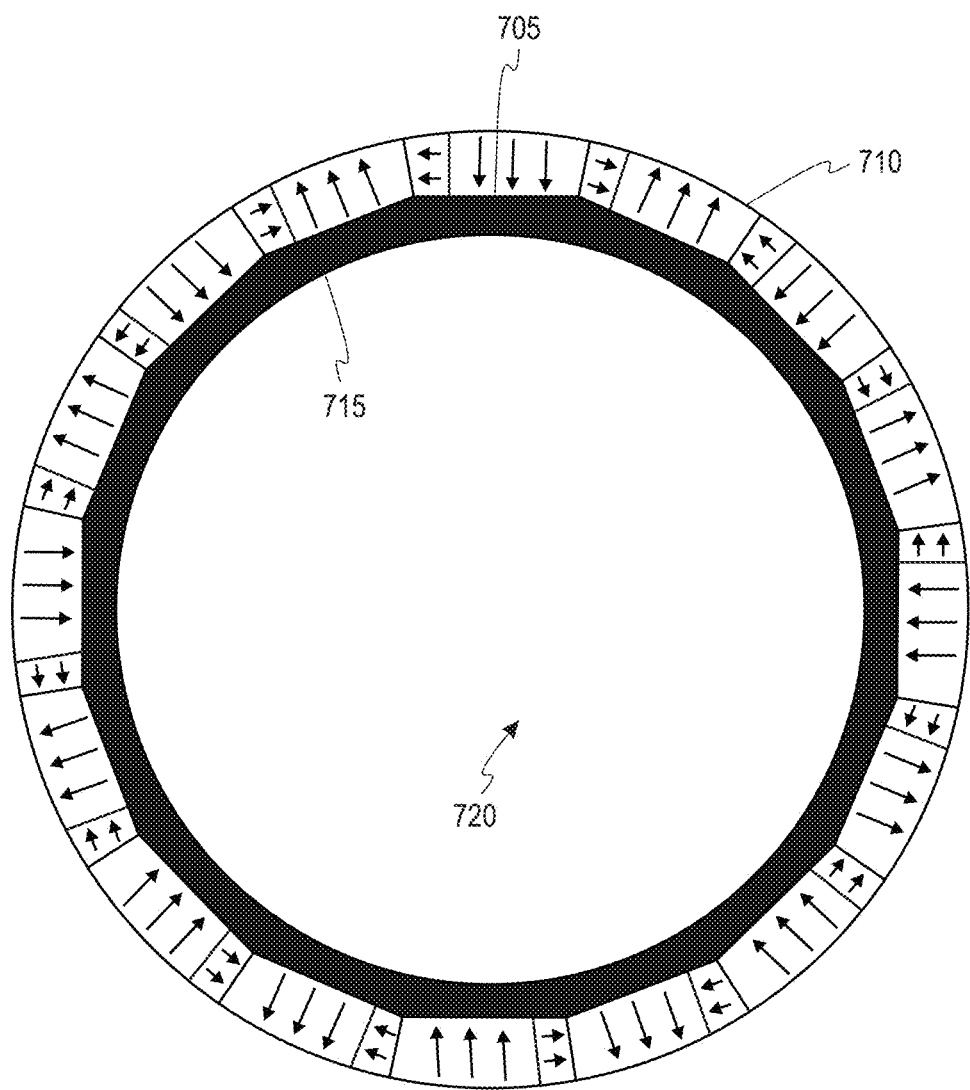
FIG. 7 illustrates an embodiment of a 16-faceted, 16-pole multi-faceted "Saban Cylinder" for a rotor assembly of a high pole count machine.

FIG. 7 illustrates an embodiment 700 of a 16-faceted, 16-pole multi-faceted "Saban cylinder" for a rotor assembly 720 of a high pole count machine. A "Saban cylinder," as used herein, refers to an array of permanent magnet assemblies 710 for a cylinder, such as a rotor assembly 720, in which each permanent magnet assembly comprises a permanent magnet which is polarized in either a north-seeking or south-seeking direction, and an interpole permanent magnet which is polarized in a direction orthogonal to a north-seeking or south-seeking direction. In a Saban Cylinder, for example, a permanent magnet which is polarized in either a north-seeking or south-seeking direction and which has a larger volume than that of an interpole permanent magnet of the permanent magnet assembly.

In embodiment 700, a permanent magnet is considered to be polarized in a north-seeking direction if the permanent magnet is polarized in an axial direction opposing a center axis of the rotor hub 720. Similarity, a permanent magnet is considered to be polarized in a south-seeking direction if the permanent magnet is polarized in an axial direction toward a center of rotor hub 720.

As shown, a permanent magnet assembly 710 is affixed to each facet 705 of a rotor hub 715. As shown, a permanent magnet assembly 710 may include a first permanent magnet having a north-seeking or south-seeking pole. In the example shown in FIG. 7, if a first permanent magnet is polarized such that it is north-seeking or south-seeking, a second permanent magnet of the assembly 710 may be polarized in an interpole direction different from that of the first magnet segment.

A magnetic flux profile for embodiment 700 may have advantageous characteristics to, e.g., reduce unused magnetic flux. For example, a magnetic flux may be generally skewed in a direction inward from the rotor assembly 715, instead of being distributed equally inward and outward of the rotor assembly 715, for example.

In a particular implementation, individual facets may have an approximately uniform shape, such as an approximately uniform rectangular prism shape. Accordingly, corresponding permanent magnet pole segments may comprise an approximately rectangular prism shape or some other shape which effectively conforms to a shape of corresponding facets on a rotor hub. By utilizing an approximately uniform rectangular prism shape for a permanent magnet pole segment, for example, manufacturing and/or machining costs may be reduced. For example, a plurality of permanent magnet pole segments may be produced and certain costs efficiencies, such as economies of scale, may be realized. Moreover, if a permanent magnet pole segment is damaged or otherwise faulty, the damaged permanent magnet pole segment may be readily replaced with another permanent magnet pole segment having common dimensions, for example. To affix a permanent magnet pole segment, the permanent magnet pole segment may have an approximately flat bottom surface which may be glued or otherwise adhered to a corresponding approximately flat top surface of a facet of a rotor hub. For example, a bottom surface of a permanent magnet pole segment may be bonded to a top surface of a facet of a rotor hub via glue or some other adhesive material, for example.

Use of a permanent magnet assembly 710 having a permanent magnet polarized in a north-seeking or south-seeking direction and an interpole permanent magnet on the same facet such as shown in FIG. 7 may improve a flux signature of rotor hub 720. For example, a particular combination of permanent magnet assemblies may be selected and utilized to increase a density or amount of magnetic flux per pole of a rotor hub 720. In an embodiment, a retention ring may be included around a rotor hub 720 to assist in keeping permanent magnet pole segments in place around the rotor hub 720. By selecting an appropriate combination of permanent magnet assemblies, a magnetic flux density of rotor hub 720 may be improved so that stress on a riser of a retention ring may be reduced, for example.

FIG. 7 illustrates an embodiment 700 in which each facet 705 has approximately the same dimensions. For example, in a view of embodiment 700 as shown in FIG. 7, the outer edge of each facet 705 may be considered a chord. As illustrated, each facet 705 has approximately the same chord length. A "chord length," as used herein, refers to a length of a facet along a flat planar surface extending along a perimeter of the rotor hub in a direction approximately orthogonal to a plane extending between a central axis of the rotor and an approximate midpoint of the facet. FIG. 7 illustrates that permanent magnet assembly 710 having a permanent magnet polarized in a north-seeking or south-seeking direction and an interpole permanent magnet is affixed to each facet, where the permanent magnet polarized in a north-seeking or south-seeking direction has larger dimensions than that of the interpole permanent magnet.

In another embodiment, for example, facets having different chord lengths may be utilized. For example, each permanent magnet polarized in a north-seeking or south-seeking direction may be affixed to its own facet and each interpole permanent magnet may similarly be affixed to its own facet. In this particular embodiment, a chord length of a facet to which the permanent magnet polarized in a north-seeking or south-seeking direction is to be affixed may correspondingly have a larger chord length than that of a facet to which the interpole permanent magnet is be affixed. In another embodiment, facets of more than two different chord lengths may be utilized, for example.

A Saban cylinder comprising permanent magnet pole segments in accordance with an embodiment shown in FIG. 7 differs from and provides an improved magnetic flux profile relative to that of a Halbach cylinder, for example.

Figure 8:
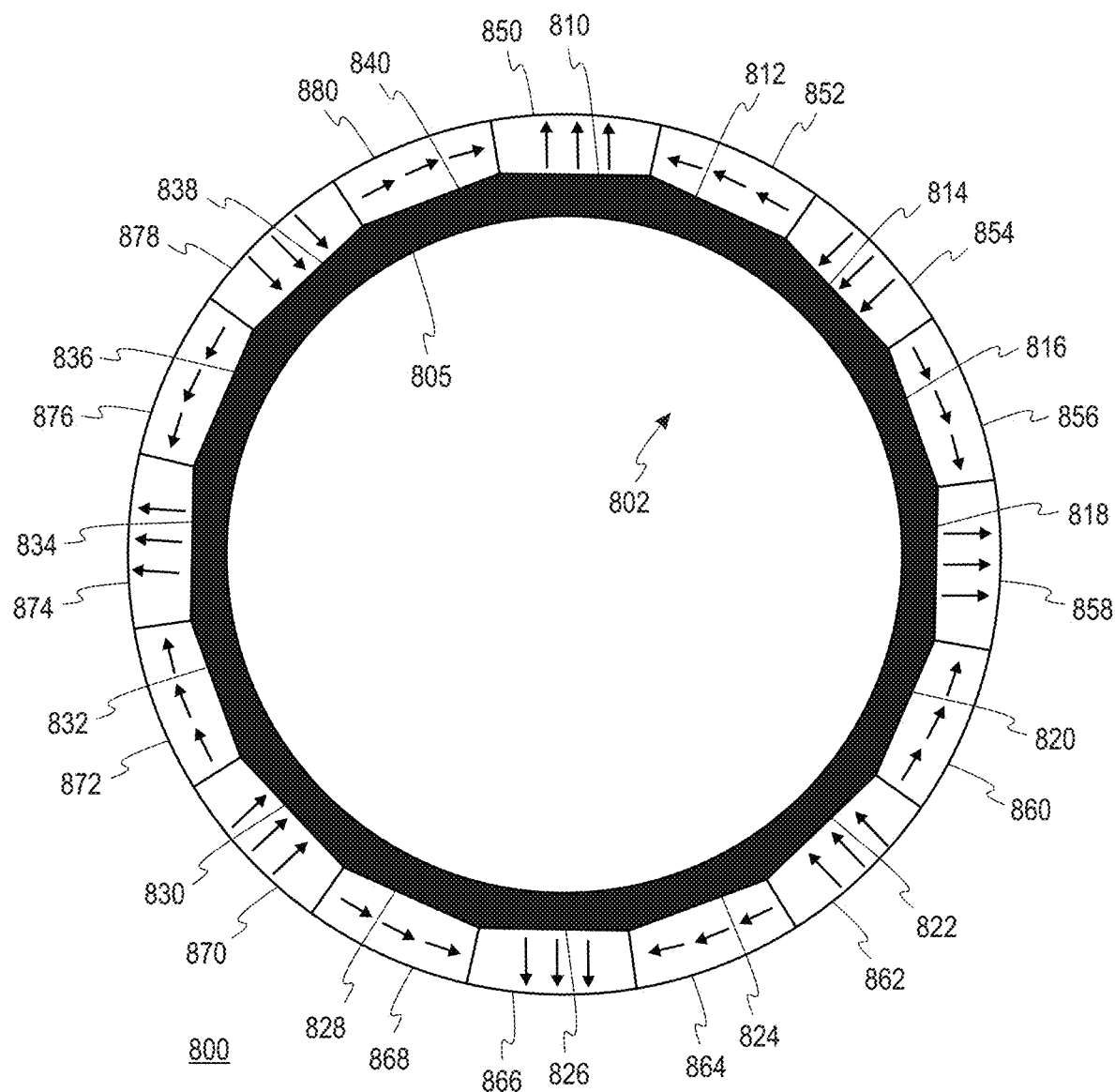
FIG. 8 illustrates an embodiment of an 8-pole, 16-faceted Halbach cylinder.

FIG. 8 illustrates an embodiment 800 of an 8-pole, 16-faceted Halbach cylinder. Embodiment 800 of FIG. 8 includes half of the number of magnetic poles of embodiment 700 of FIG. 7 for the same number of facets in the illustrated embodiments, although different implementations may utilize different numbers of magnetic poles, for example.

As shown, multi-faceted rotor hub 805 has sixteen different facets, e.g., first facet 810, second facet 812, third facet 814, fourth facet 816, fifth facet 818, sixth facet 820, seventh facet 822, eight facet 824, ninth facet 826, tenth facet 828, eleventh facet 830, twelfth facet 832, thirteenth facet 834, fourteenth facet 836, fifteenth facet 838, and sixteenth facet 840. Is it noted that sixteen facets are illustrated in embodiment 800 of FIG. 8 for the sake of simplicity. It should be appreciated to depending upon a particular application, a rotor hub having more or fewer than sixteen facets may be utilized. In one particular implementation, a number of facets, as counted in a circumferential direction along a rotor hub, may be equal to two times the number of poles. For example, in a 48-pole machine, a Halbach cylinder may utilize a minimum of two facets per pole, or 96 facets overall.

A permanent magnet may be affixed to each individual facet. For example, only one permanent magnet may be affixed to individual facets of rotor hub 805. In embodiment 800, each of the permanent magnet pole segments may be polarized so that the permanent magnet pole segment is north-seeking or south-seeking, or may comprise an interpole magnet segment polarized in a direction substantially orthogonal or in a different direction to that of a north-seeking or south-seeking magnet segment.

For example, a first permanent magnet 850 is affixed to first facet 810, a second permanent magnet 852 is affixed to second facet 812, a third permanent magnet 854 is affixed to third facet 814, a fourth permanent magnet 856 is affixed to fourth facet 816, a fifth permanent magnet 858 is affixed to fifth facet 818, a sixth permanent magnet 860 is affixed to sixth facet 820, a seventh permanent magnet 862 is affixed to seventh facet 822, an eighth permanent magnet 864 is affixed to eighth facet 824, a ninth permanent magnet 866 is affixed to ninth facet 826, a tenth permanent magnet 868 is affixed to tenth facet 828, an eleventh first permanent magnet 870 is affixed to eleventh facet 830, a twelfth permanent magnet 872 is affixed to twelfth facet 832, a thirteenth permanent magnet 874 is affixed to thirteenth facet 834, a fourteenth permanent magnet 876 is affixed to fourteenth facet 836, a fifteenth permanent magnet 878 is affixed to fifteenth facet 838, and a sixteenth permanent magnet 880 is affixed to sixteenth facet 840.

Of the permanent magnets, first permanent magnet 850, fifth permanent magnet 858, ninth permanent magnet 866, and thirteenth permanent magnet 874 are polarized in north-seeking direction. Of the permanent magnets, third permanent magnet 854, seventh permanent magnet 862, eleventh permanent magnet 870, and fifteenth permanent magnet 878 are polarized in a south-seeking. Of the permanent magnets, second permanent magnet 852, fourth permanent magnet 856, sixth permanent magnet 860, eighth permanent magnet 864, tenth permanent magnet 868, twelfth permanent magnet 872, fourteenth permanent magnet 876, and sixteenth permanent magnet 880 comprise interpole magnets segments polarized in a direction substantially orthogonal to that of a north-seeking or south-seeking magnet segment.

A Halbach cylinder is a magnetized cylinder composed of ferromagnetic material producing (e.g., in an idealized case) an intense magnetic field confined entirely within the cylinder with zero field outside. The cylinders can also be magnetized such that the magnetic field is entirely outside the cylinder, with zero magnetic field inside the cylinder. Several magnetization distributions are shown:

The direction of magnetization within the ferromagnetic material, in plane perpendicular to the axis of the cylinder, is given by $$M=M_r[\cos((k-1)(\phi-\pi/2))\hat{\rho}+\sin((k-1)(\phi-\pi/2))\hat{\phi}] \quad \text{[Relation 1]}$$

where M refers to a direction of magnetization; $M_r$ refers to a ferromagnetic remanence (A/m); and k refers to a wavenumber of a magnetic sheet given by a particular spacing between magnetic segments with the same magnetization vector.

An array of permanent magnets of a Saban cylinder for a multi-faceted rotor hub, such as shown in FIG. 7 may generate a magnetic flux similar to that of an array for a Halbach cylinder. However, unlike a Halbach cylinder which may require a minimum of two facets per pole, or a total of 96 facets for a 48-pole machine, an array for a Saban cylinder in accordance with FIG. 7 may utilize fewer facets. For example, an embodiment of a Saban cylinder in accordance with FIG. 7 where interpole magnets are utilized on a permanent magnet assembly with a north-seeking or south-seeking permanent magnet may achieve a magnetic flux similar to that of an array for a Halbach cylinder via use of one facets per pole, or a total of 48 facets for a 48-pole machine.

Moreover, magnet pieces are cut or extracted from a permanent magnet block and then mounted in a particular order for a discrete magnetization vector for a Halbach cylinder. However, such a process may be relatively expensive because permanent magnets having various different orientations may be required in order to realize a Halbach cylinder. For example, an objective of a Halbach cylinder is to ensure that a magnetic flux on an interior of the Halbach cylinder is essentially zero or negligible. In a Halbach cylinder, for example, a radial span or area of north-seeking and south-seeking permanent magnets is approximately equal to a radial span or area of interpole magnet segments. Because the radial span or area of north-seeking and south-seeking permanent magnets is approximately equal to a radial span or area of interpole magnet segments in a Halbach cylinder, a relatively large number of permanent magnets may be required to be utilized in order to ensure that there is sufficient room or spacing to turn a rotor of an electrical machine utilizing such a Halbach cylinder.

In an array in accordance with a Saban cylinder of FIG. 7, on the other hand, a radial span or area of north-seeking and south-seeking permanent magnets may be larger than a radial span or area of interpole permanent magnets. In one particular embodiment, a radial span or area of north-seeking and south-seeking permanent magnets may be approximately three times as large as a radial span or area of interpole permanent magnets. A radial span or area of north-seeking and south-seeking permanent magnets, on the other hand, may be the same as a radial span or area of interpole permanent magnets in a Halbach cylinder.

An array of a Saban cylinder in accordance with FIG. 7 may therefore be realized with fewer magnet segments than may be utilized in a Halbach cylinder in accordance with FIG. 8. An array of a Saban cylinder in accordance with FIG. 7 may comprise a relatively less magnetic material relatively to a Halbach cylinder and may be mounted onto a ferrous structure. An array of a Saban cylinder in accordance with FIG. 7 may allow some flux internal to the array, unlike a Halbach array, while increasing a magnetic flux external to the array. Accordingly, by utilizing an array of a Saban cylinder in accordance with FIG. 7, a magnetic flux of an electrical machine may be improved while utilizing relatively few magnet segments. By improving a magnetic flux density, for example, a relatively lighter-weight or potentially smaller stator may be utilized within the electrical machine in accordance with an embodiment. Moreover, a torque density of the electrical machine may also be improved or increased.

Figure 11A:
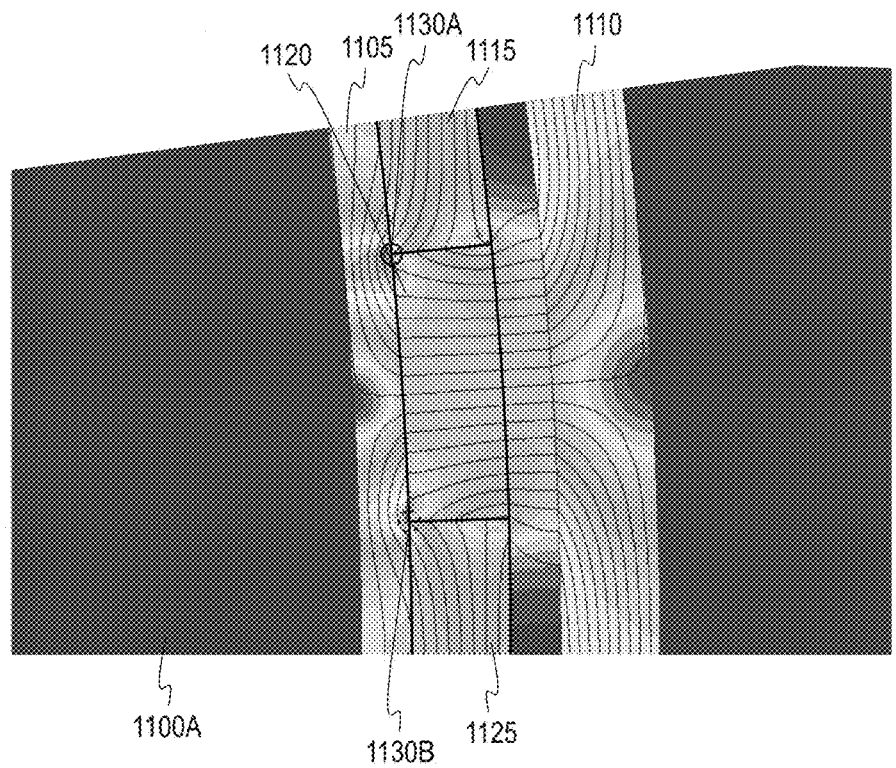
FIGS. 11A-C illustrate embodiments of a section of a Halbach cylinder.
Figure 11B:
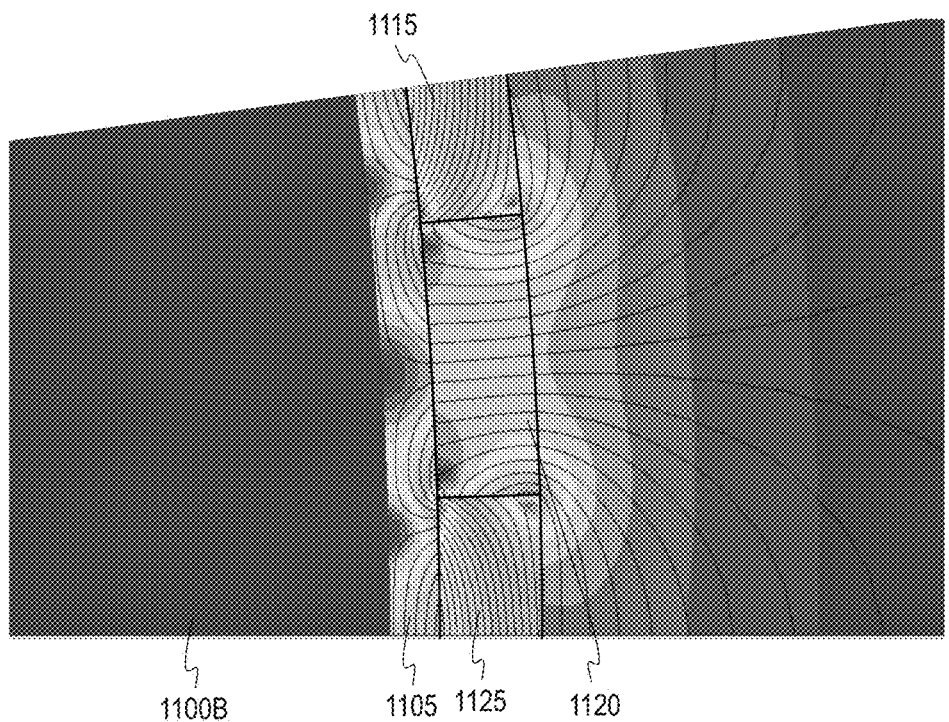
Figure 11C:
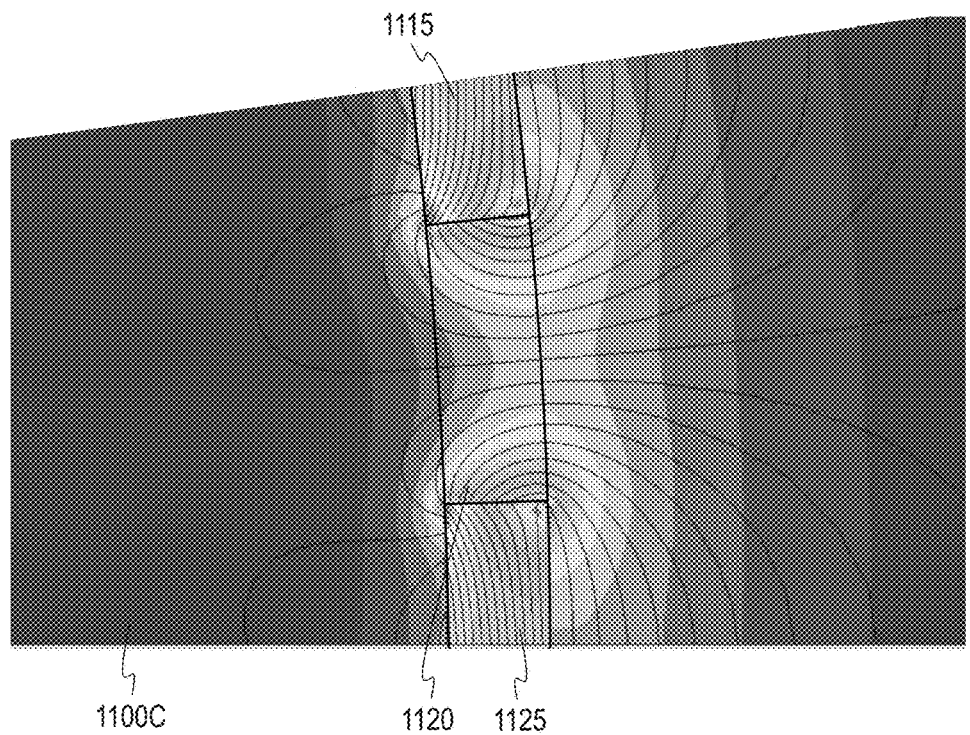
Figure 12A:
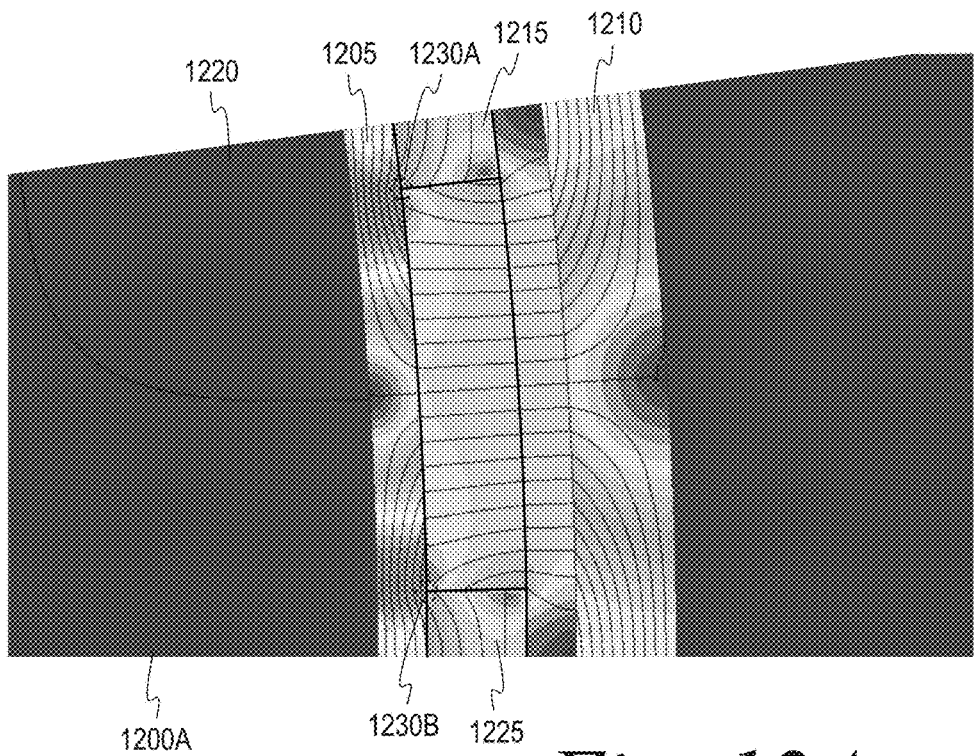
FIGS. 12A-D illustrate embodiments of a section of a Saban cylinder.
Figure 12B:
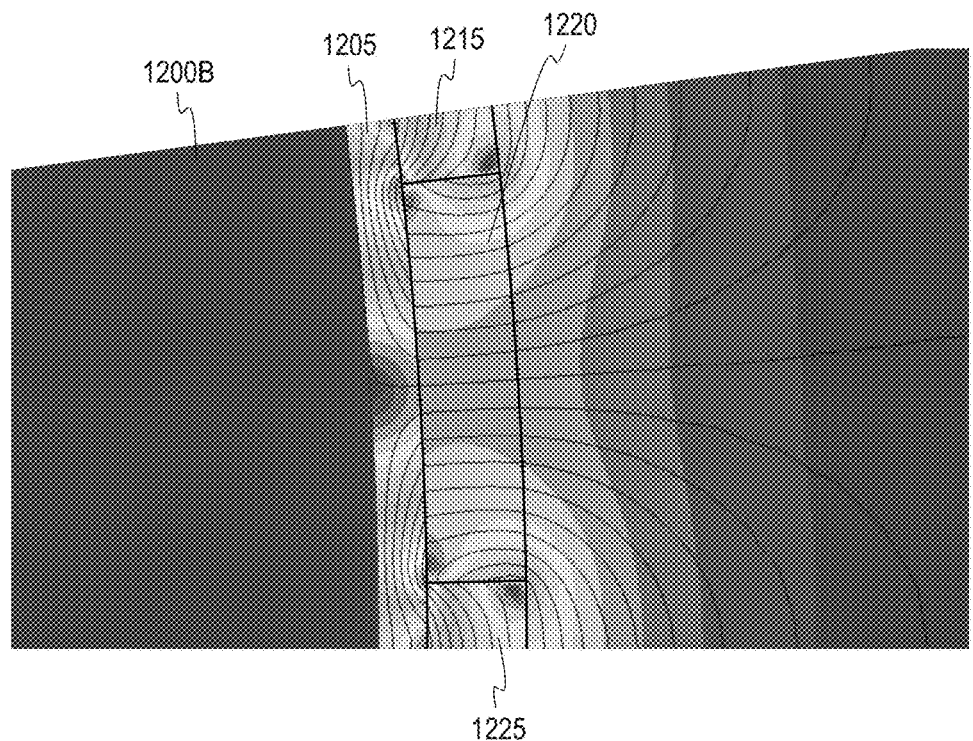
Figure 12C:
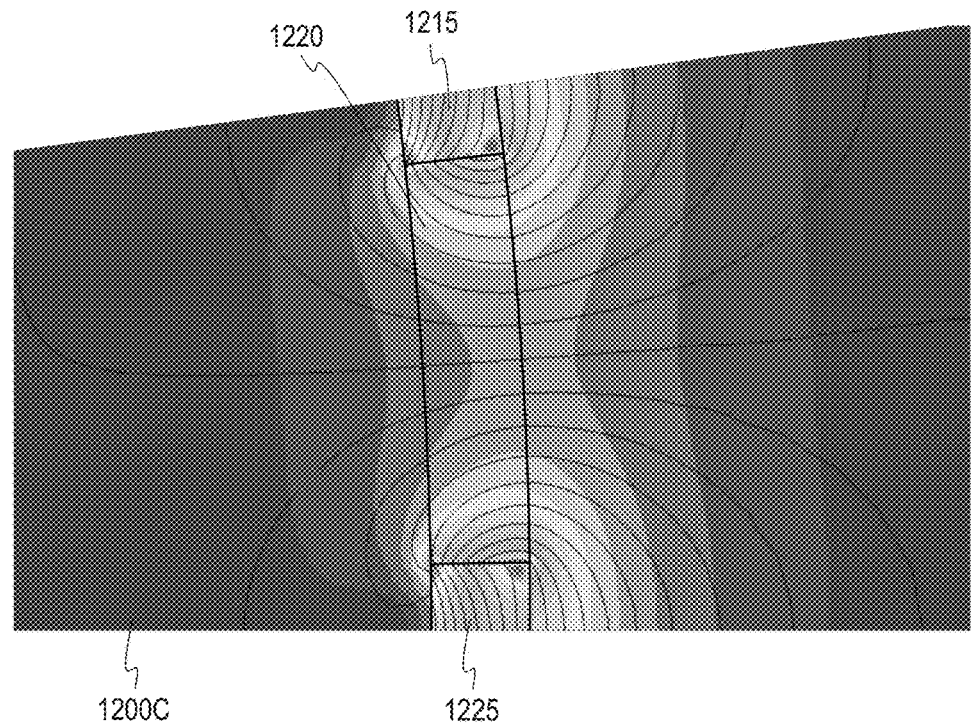

FIGS. 11A-C illustrate embodiments of a Halbach cylinder. FIGS. 12A-C illustrate embodiments of a Saban cylinder. A magnetic flux density of a Saban cylinder in accordance with FIGS. 12A-C is improved relative to a magnetic flux density of a Halbach array in accordance with FIGS. 11A-C. By employing an electrical machine having an improved or increased flux density, a torque density may be increased such that thrust for a take-off or landing procedure of an airplane may be generated more efficiently, for example.

FIG. 11A illustrates an embodiment 1100A of a section of a Halbach cylinder. For the sake of simplicity, only a section of a Halbach cylinder is show in FIG. 11A, although it should be appreciated that a full Halbach cylinder may include a plurality of sections similar to that of embodiment 1100A spanning around a perimeter of an electrical machine, for example. Embodiment 1100A includes a rotor surface 1105, which may include a facet, a stator surface 1110, and three permanent magnets which include a first permanent magnet 1115, a second permanent magnet 1120, and a third permanent magnet 1125. A shown, second permanent magnet 1120 comprises a north-seeking or south-seeking magnet which is polarized in a direction orthogonal to the rotor surface 1105. First permanent magnet 1115 and third permanent magnet 1125 each comprises an interpole magnet segment. In this example, first permanent magnet 1115 and third permanent magnet 1125 are each polarized in a direction oblique to the rotor surface 1105. As shown, a volume of a combination of the volumes of the two interpole permanent magnets, first permanent magnet 1115 and third permanent magnet 1125, is equal to a volume of second permanent magnet 1120 polarized in a north-seeking or south-seeking direction.

In embodiment 1100A, a Halbach cylinder may be realized such that a measurement of flux density on an interior of a rotor hub is approximately zero such that approximately all of the flux density is directed to an exterior of the rotor hub. In embodiment 1100A, a Halbach cylinder may be realized via use of permanent magnets which are polarized in various different directions. For example, a Halbach cylinder in accordance with embodiment 1100A may utilize twenty or more permanent magnets, each of which is polarized in a different direction so that a sum of the magnetic flux densities of the permanent magnets results in a desired magnetic flux density having approximately zero magnetic flux density on an interior of the rotor hub.

In embodiment 1100A, the rotor surface 1105, for example, may be comprised of a material which is non-ferrous, such as aluminum, or which is relatively non-ferrous. For example, because a sum of magnetic flux densities for polarized magnets disposed around a perimeter of a rotor hub of a Halbach cylinder are to generate a composite magnet flux density which resides almost entirely on an exterior of the rotor hub, use of non- or relatively non-ferrous materials for the rotor surface 1105 may be included so that a magnetic flux density of material forming the rotor surface 1105 does not adversely affect a composite magnetic flux density of the rotor hub. However, in order to achieve an appropriate magnetic flux density for a Halbach cylinder, a relatively large number of polarized magnets may need to be utilized in order to achieve a desired composite magnetic flux density. Use of an increased number of permanent magnets, however, may increase overall complexity of design and may additionally be more difficult and time-consuming to manufacture, for example.

Referring back to embodiment 1100A of FIG. 11A, each component of embodiment 1100A has its own magnetic flux density, which collectively combine to form a composite magnetic flux density for an electrical machine. As shown, the rotor surface 1105 has a relatively low amount of magnetic flux as indicated by the shading for a magnetic flux density illustrated in FIG. 11A. For example, areas 1130A and 1130B of the rotor surface 1105 of embodiment 1100A have a relatively light shading to indicate a relatively small amount of magnet flux density within this section of a Halbach cylinder.

FIG. 11B illustrates an embodiment 1100B of a section of a Halbach cylinder. Embodiment 1100B of FIG. 11B is similar to embodiment 1100A of FIG. 11A except that embodiment 1100B omits a stator surface 1100. As shown in embodiment 1100B, magnetic flux is directed toward an exterior of the rotor surface 1105.

FIG. 11C illustrates an embodiment 1100C of a section of a Halbach cylinder. Embodiment 1100C of FIG. 11C is similar to embodiments 1100A of FIG. 11A and 1100B of FIG. 11B except that embodiment 1100C omits a stator surface 1100 and the rotor surface 1105. Accordingly, embodiment 1100C therefore illustrates a Halbach cylinder in free space which is not coupled to a rotor or a stator. As illustrated, a magnetic flux density of the Halbach cylinder in embodiment 1100C is directed toward an exterior of the Halbach cylinder.

FIG. 12A illustrates an embodiment 1200A of a section of a Saban cylinder. For the sake of simplicity, only a section of a Saban cylinder is show in FIG. 12A, although it should be appreciated that a full Saban cylinder may include a plurality of sections similar to that of embodiment 1200A spanning around a perimeter of an electrical machine, for example. Embodiment 1200A includes the rotor surface 1205, a stator surface 1210, and three permanent magnets which include a first permanent magnet 1215, a second permanent magnet 1220, and a third permanent magnet 1225. A shown, second permanent magnet 1220 comprises a north-seeking or south-seeking magnet segment which is polarized in a direction orthogonal to the rotor surface 1205. First permanent magnet 1215 and third permanent magnet 1225 each comprises an interpole magnet. In this example, first permanent magnet 1215 and third permanent magnet 1225 are each polarized in a direction parallel to the rotor surface 1205.

A Saban cylinder may require a smaller ferrous flux path on a rotor hub than would a Halbach cylinder, for example. A Saban cylinder also differs from a Halbach cylinder in that a volume of a combination of the volumes of the two interpole permanent magnets, first permanent magnet 1215 and third permanent magnet 1225, may be less than a volume of second permanent magnet 1220 polarized in a north-seeking or south-seeking direction. A Saban cylinder may achieve a desirable flux density with use of permanent magnet material than that of a Halbach cylinder, for example.

In embodiment 1200A, a Saban cylinder may be realized such that a measurement of flux density within the electrical machine is increased relative to that of a Halbach cylinder. In embodiment 1200A, a Saban cylinder may be realized via use of permanent magnets which are polarized in in north-seeking or south-seeking direction which is orthogonal to the rotor surface 1205 onto which the permanent magnets are adhered. The Saban cylinder may also include permanent magnets which are polarized in a direction parallel to the rotor surface 1205 onto which the permanent magnets are adhered. As shown in embodiment 1200A, a surface area of the second permanent magnet 1220 which is polarized in a north-seeking or south-seeking direction orthogonal to the rotor surface 1205 is larger than a combination of surface areas of the first and second permanent magnets 1215, 1225 which are polarized in an interpole direction parallel to the rotor surface 1205. Accordingly, embodiment 1200A differs from embodiment 1100A of FIG. 11A in which the surface area of the second permanent magnet 1120 is approximately equal to a combined surface area of the first and second permanent magnets 1115, 1125.

In embodiment 1200A, the rotor surface 1205, for example, may be comprised of a material which is ferrous, such as steel. Because the rotor surface 1205 is comprised of a ferrous material, a rotor surface of a Saban cylinder may be more massive and may therefore weigh more than would a rotor surface of a Halbach cylinder in accordance with embodiment 1100A. However, by utilizing the rotor surface 1205 which is comprised of a ferrous material, a Saban cylinder has an improved magnetic flux density within the rotor surface 1205 than would a Halbach cylinder. For example, there may be a radial flux within a ferrous material of the rotor surface 1205. Moreover, although a rotor surface of a Saban cylinder may be more massive and may therefore weighs more than a rotor surface of a Halbach cylinder, a Saban cylinder may be easier to manufacture and relatively more cost-effective than a Halbach cylinder. For example, a Halbach cylinder may require the use of far more permanent magnets than may be utilized in a Saban array. For example, because a ferrous material is utilized for the rotor surface 1205, an internal magnetic flux density of the rotor hub may be utilized in combination with the magnetic flux densities of the permanent magnets which are adhered thereto such that a composite magnetic flux density of the overall electrical machine is increased relative to that of a Halbach cylinder.

Referring back to embodiment 1200A of FIG. 12A, each component of embodiment 1200A has its own magnetic flux density, which collectively combine to form a composite magnetic flux density for an electrical machine. As shown, the rotor surface 1205 has a relatively larger amount of magnetic flux as indicated by the shading for a magnetic flux density and relatively closer flux lines illustrated in FIG. 12A. For example, areas 1230A and 12308 of the rotor surface 1205 of embodiment 1200A have a relatively darker shading to indicate a relatively large amount of magnetic flux density within this section of a Saban cylinder relative to corresponding areas 1130A and 1130B of the rotor surface 1105 of embodiment 1100A of FIG. 11A.

FIG. 12B illustrates an embodiment 1200B of a section of a Saban cylinder. Embodiment 1200B of FIG. 12B is similar to embodiment 1200A of FIG. 12A except that embodiment 1200B omits a stator surface 1200. As shown in embodiment 1200B, magnetic flux is directed toward an exterior of the rotor hub onto which the rotor surface 1205 is disposed.

FIG. 12C illustrates an embodiment 1200C of a section of a Saban cylinder. Embodiment 1200C of FIG. 12C is similar to embodiments 1200A of FIG. 12A and 1200B of FIG. 12B except that embodiment 1200C omits a stator surface 1200 and the rotor surface 1205 of a rotor hub. Accordingly, embodiment 1200C therefore illustrates a Saban cylinder in free space which is not coupled to a rotor or a stator. As shown in embodiment 1200C, a magnetic flux density is directed toward an exterior of the Saban cylinder.

Figure 12D:
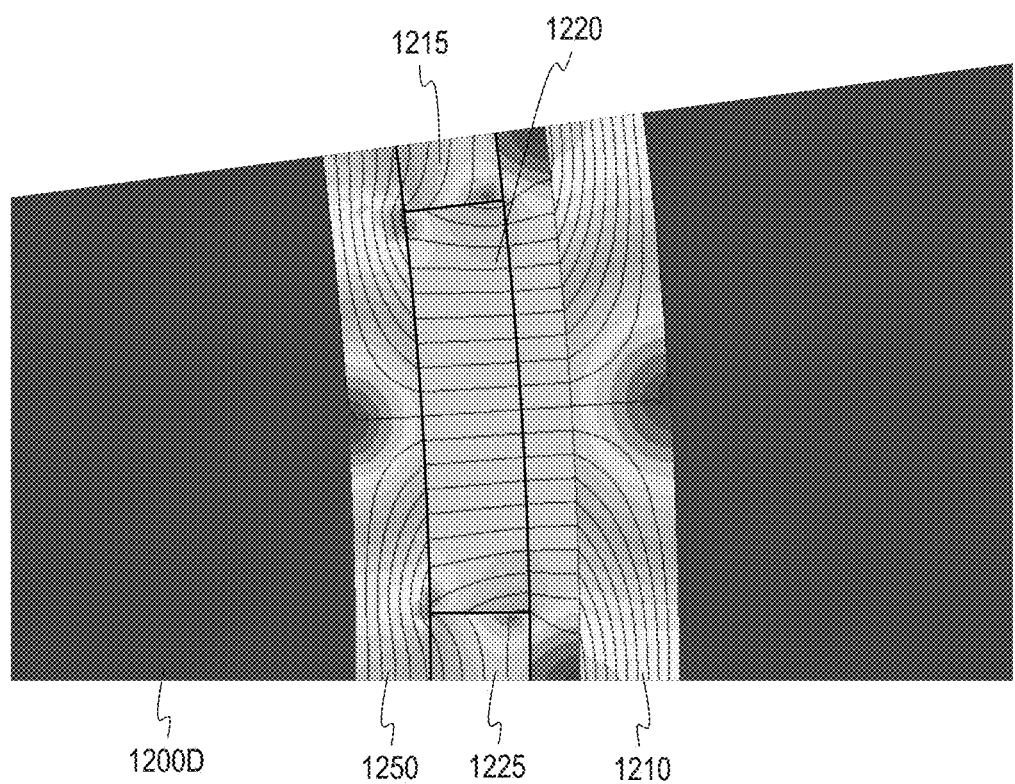

FIG. 12D illustrates an embodiment 1200D of a section of a Saban cylinder. Embodiment 1200D of FIG. 12D is similar to embodiment 1200B of FIG. 12B except that embodiment 1200D utilizes a rotor surface 1250 which is thicker than the rotor surface 1205 of FIG. 12B. By utilizing a thicker rotor surface 1205, for example, an improved magnetic flux density may be realized, as illustrated by the shading showing magnetic flux density and relatively closer flux lines shown in embodiment 1200D.

A Saban cylinder may optimize a pole arc to increase or maximize, for example, an amount of flux-per-pole for an electrical machine relative to the amount of magnetic material utilized therein. A Halbach cylinder, on the other hand, may be designed to minimize the interior magnetic flux of the electrical machine.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

In the present patent application, in a particular context of usage, such as a situation in which tangible components (and/or similarly, tangible materials) are discussed above, a distinction exists between being "on" and being "over." As an example, deposition of a substance "on" a substrate refers to a deposition involving direct physical and tangible contact without an intermediary, such as an intermediary substance, between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under"," as used herein, are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes an underlayment embodiment, as one illustration, in which, for example, orientation at various times (e.g., during fabrication or application) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

It is further noted that the terms "type" and/or "like," as used herein, such as with a feature, structure, characteristic, and/or the like, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," if the minor variations are sufficiently minor so that the feature, structure, characteristic, and/or the like would still be considered to be substantially present with such variations also present. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, to be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall with the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A rotor for an electrical machine, comprising:
   a rotor hub comprising a multi-faceted surface extending along a perimeter of the rotor hub, wherein each facet of the multi-faceted surface has a substantially planar surface that is discontinuous with respect to a substantially planar surface of an adjacent facet;
   a plurality of permanent magnet assemblies disposed circumferentially around the multi-faceted surface, wherein each individual permanent magnet assembly of the plurality of permanent magnet assemblies is coupled to the substantially planar surface of a corresponding facet and comprises:
   a first permanent magnet polarized in a direction substantially orthogonal to the substantially planar surface of the corresponding facet to which a particular permanent magnet assembly comprising the first permanent magnet is coupled, and
   at least a second permanent magnet and/or second permanent magnet pole segment of the particular permanent magnet assembly polarized in a direction substantially parallel to the planar surface of the corresponding facet to which to which the particular permanent magnet assembly is coupled.

2. The rotor of claim 1, wherein the particular permanent magnet assembly has an approximately rectangular prism shape.

3. The rotor for the electrical machine of claim 1, wherein the multi-faceted surface comprises multiple layers of facets disposed axially along the perimeter of the rotor hub.

4. The rotor for the electrical machine of claim 3, wherein at least one of the multiple layers of facets is rotationally shifted relative to an adjacent layer.

5. The rotor for the electrical machine of claim 3, wherein the rotor hub comprises a total number of facets disposed on a layer of the multiple layers of facets equal to a total number of poles of the rotor hub.

6. The rotor for the electrical machine of claim 1, wherein the particular permanent magnet assembly comprises a non-magnetic filler material disposed in a gap between the first permanent magnet and the at least a second permanent magnet and/or second magnet pole segment.

7. The rotor for the electrical machine of claim 1, wherein the particular permanent magnet assembly comprises an approximately flat planar surface affixed to the corresponding facet of the multi-faceted surface.

8. The rotor for the electrical machine of claim 1, wherein the multi-faceted surface is disposed along an exterior perimeter of the rotor hub.

9. The rotor for the electrical machine of claim 1, wherein the multi-faceted surface is disposed along an interior perimeter of the rotor hub.

10. The rotor for the electrical machine of claim 1, further comprising a magnet retention sleeve disposed around outer edges of the plurality of permanent magnet assemblies.

11. The rotor for the electrical machine of claim 1, wherein a plurality of facets of the multi-faceted surface comprise at least a first facet and a second facet, the first facet having a first chord length and the second facet having a second chord length, the first chord length being different from the second chord length.

12. An electrical machine comprising:
    a stator;
    a rotor hub disposed within the stator, comprising a multi-faceted surface extending along a perimeter of the rotor hub, wherein each facet of the multi-faceted surface has a substantially planar surface that is discontinuous with respect to a substantially planar surface of an adjacent facet;
    a plurality of permanent magnet assemblies disposed circumferentially around the multi-faceted surface, wherein each individual permanent magnet assembly of the plurality of permanent magnet assemblies is coupled to the substantially planar surface of a corresponding facet and comprises:
    a first permanent magnet polarized in a direction substantially orthogonal to the substantially planar surface of the corresponding facet to which to which a particular permanent magnet assembly comprising the first permanent magnet is coupled, and at least a second permanent magnet and/or second magnet pole segment of the particular permanent magnet assembly polarized in a direction substantially parallel to the planar surface of the corresponding facet to which to which the particular permanent magnet assembly is coupled.

13. The electrical machine of claim 12, wherein the particular permanent magnet assembly comprises an approximately flat and planar surface affixed to the corresponding facet of the multi-faceted surface.

14. The electrical machine of claim 12, wherein a plurality of facets of the multi-faceted surface comprise at least a first facet and a second facet, the first facet having a first chord length and the second facet having a second chord length, the first chord length being different from the second chord length.

15. The electrical machine of claim 12, wherein the particular permanent magnet assembly comprises a non-magnetic filler material disposed in a gap between the first permanent magnet and the at least a second permanent magnet and/or second magnet pole segment.

16. The electrical machine of claim 12, further comprising a magnet retention sleeve disposed around outer edges of the plurality of permanent magnet assemblies.

17. A rotor hub for a rotor of an electrical machine, comprising:
- a multi-faceted surface extending along a perimeter of the rotor hub, wherein each facet of the multi-faceted surface has a substantially planar surface that is discontinuous with respect to a substantially planar surface of an adjacent facet;
- wherein a plurality of permanent magnet assemblies are disposed circumferentially around the multi-faceted surface, each individual permanent magnet assembly of the plurality of permanent magnet assemblies being coupled to the substantially planar surface of a corresponding facet and comprising:
- a first permanent magnet assembly polarized in a direction substantially orthogonal to the substantially planar surface of the corresponding facet to which to which a particular permanent magnet assembly comprising the first permanent magnet is coupled, and at least a second permanent magnet and/or second permanent magnet pole segment of the particular permanent magnet assembly polarized in a direction substantially parallel to the planar surface of the corresponding facet to which to which the particular permanent magnet assembly is coupled.

18. The rotor hub of claim 17, wherein the particular permanent magnet assembly comprises an approximately flat and planar surface affixed to the corresponding facet of the multi-faceted surface.

19. The rotor hub of claim 17, further comprising a magnet retention sleeve disposed around outer edges of the plurality of permanent magnet assemblies.

20. The rotor hub of claim 17, wherein the particular permanent magnet assembly comprises a non-magnetic filler material disposed in a gap between the first segment and the at least a second segment.

* * * * *